(12) United States Patent
Nozawa

(10) Patent No.: US 8,968,472 B2
(45) Date of Patent: Mar. 3, 2015

(54) VALVE AND PROCESSING APPARATUS PROVIDED WITH THE SAME

(75) Inventor: Toshihisa Nozawa, Amagasaki (JP)

(73) Assignee: Tokyo Electron Limited, Tokyo (JP)

( * ) Notice: Subject to any disclaimer, the term of this patent is extended or adjusted under 35 U.S.C. 154(b) by 892 days.

(21) Appl. No.: 12/598,238

(22) PCT Filed: Apr. 30, 2008

(86) PCT No.: PCT/JP2008/058279
§ 371 (c)(1),
(2), (4) Date: Oct. 30, 2009

(87) PCT Pub. No.: WO2008/139937
PCT Pub. Date: Nov. 20, 2008

(65) Prior Publication Data
US 2010/0132891 A1  Jun. 3, 2010

(30) Foreign Application Priority Data

May 8, 2007 (JP) .................................. 2007-123266
May 8, 2007 (JP) .................................. 2007-123267

(51) Int. Cl.
*F16K 3/06* (2006.01)
*F16K 3/04* (2006.01)
*C23C 16/455* (2006.01)

(52) U.S. Cl.
CPC ....................................... *F16K 3/06* (2013.01)
USPC .................. 118/715; 118/723 MW; 251/301; 251/298; 156/345.41

(58) Field of Classification Search
CPC ............... F16K 3/04; F16K 3/06; F16K 1/16; F16K 1/18; F16K 1/20; F16K 1/205; F16K 1/221; C23C 16/4414

USPC ........ 118/715, 723 MW; 156/345.41, 345.29; 251/298, 301

See application file for complete search history.

(56) References Cited

U.S. PATENT DOCUMENTS 2,635,392 A * 4/1953 Gratzmuller ............. 137/505.47
2,948,553 A * 8/1960 Gill et al. ................. 137/614.02

(Continued)

FOREIGN PATENT DOCUMENTS

JP  63-106468  5/1988
JP  01-146073  10/1989

(Continued)

OTHER PUBLICATIONS

Korean Office Action mailed Sep. 1, 2011 with partial translation.

(Continued)

*Primary Examiner* — Jeffrie R Lund
*Assistant Examiner* — Yuechuan Yu
(74) *Attorney, Agent, or Firm* — IPUSA, PLLC

(57) ABSTRACT

A disclosed valve comprises a first valve body including first and second openings that permit gaseous communication between a chamber and an evacuation apparatus; a sealing valve element that moves near/away from the second opening to open/close the second opening; a sealing member provided in the sealing valve element to seal the second opening when the sealing valve element closes the second opening; a valve element retreat area that is provided in an inner wall of the first valve body away from the second opening, and shields the sealing member from an inside of the first valve body when the sealing valve element is moved to the valve element retreat area; and a first pivot shaft that pivots the sealing valve element so that the sealing valve element may be located in one of the second opening and the valve element retreat area.

19 Claims, 18 Drawing Sheets

(56) References Cited

U.S. PATENT DOCUMENTS

| | | | | |
|---|---|---|---|---|
| 3,237,916 A | * | 3/1966 | Bryant | 251/158 |
| 3,463,447 A | * | 8/1969 | Ripert | 251/158 |
| 5,722,668 A | * | 3/1998 | Rice et al. | 277/650 |
| 6,161,576 A | * | 12/2000 | Maher et al. | 137/565.23 |
| 6,409,149 B1 | * | 6/2002 | Maher, Jr. | 251/328 |
| 2002/0088959 A1 | * | 7/2002 | Duelli | 251/158 |
| 2004/0200534 A1 | | 10/2004 | Ishigaki | |
| 2004/0256591 A1 | * | 12/2004 | Latzer et al. | 251/326 |
| 2006/0182534 A1 | * | 8/2006 | Hiroki | 414/217 |

FOREIGN PATENT DOCUMENTS

| | | | | |
|---|---|---|---|---|
| JP | 09-178000 | | 7/1997 | |
| JP | 09-249960 | * | 9/1997 | C23C 14/00 |
| JP | 2000-74229 | | 3/2000 | |
| JP | 2003-56724 | | 2/2003 | |
| JP | 2004204996 A | * | 7/2004 | |
| JP | 2004-286131 | | 10/2004 | |
| JP | 2005-9678 | | 1/2005 | |
| JP | 2006005008 A | * | 1/2006 | |
| JP | 2006-170373 | | 6/2006 | |

OTHER PUBLICATIONS

Chinese Office Action dated Aug. 23, 2010 with partial translation.

Japanese Office Action mailed on Oct. 18, 2011 with partial translation.

\* cited by examiner

VALVE AND PROCESSING APPARATUS PROVIDED WITH THE SAME

TECHNICAL FIELD

The present invention relates to a valve to be provided between an evacuation apparatus and a chamber of a processing apparatus where a vacuum process is carried out on an object to be processed such as a semiconductor wafer and the like, and a processing apparatus provided with such a valve. Specifically, the present invention relates to a sealing valve that can seal between the chamber of the processing chamber and the evacuation apparatus, a sealing valve capable of controlling a pressure in the chamber, and the processing apparatus provided with these sealing valves.

BACKGROUND ART

In a semiconductor fabrication process, various vacuum processes such as film deposition, etching, and the like are carried out. In processing apparatuses for carrying out such vacuum processes, a semiconductor wafer to be processed is transferred into a chamber the inside of which is evacuatable to vacuum, and the chamber is evacuated to vacuum by an evacuation apparatus including a vacuum pump, thereby carrying out a predetermined process on the semiconductor wafer.

During the process, the chamber is evacuated by the vacuum pump, and an inner pressure of the chamber is controlled by adjusting an opening degree of a pressure control valve provided between the chamber and the vacuum pump. Such pressure control valves are described, for example, in Patent Document 1 (Japanese Patent Laid-Open Publication No. H09-178000) and Patent Document 2 (Japanese Patent Laid-Open Publication No. 2005-9678. The pressure control valves described in these documents are configured so that a circular plate valve element is provided at the distal end of an arm extending from a pivot shaft, and the pivot shaft is pivoted to allow the valve element to move from a position where the valve element closes a flow passage to another position where the valve element fully opens the flow passage.

The pressure control valves described in Patent Documents 1 and 2 are provided in a valve body with two openings that provide a fluid passage and a space that houses the circular plate valve element, the space being provided in a direction intersecting the fluid passage. The circular plate valve element is integrally provided at the distal end of the pivot shaft arm. When the pressure control valve is fully open, the circular plate element is positioned inside the space. Namely, the element is positioned sideways to the fluid passage, and thus the openings are fully opened.

On the other hand, when the element is moved to a position where the openings are completely covered by the valve element, a sealing member attached on the valve element is not in firm contact with the openings, and does not completely seal the openings. In order for the valve element to seal the opening, a cylinder-shaped sealing joint member is moved along a shaft direction to press the sealing member of the element toward the opening, thereby sealing the opening.

Incidentally, Patent Document 3 describes a gate valve configured so that a flow rate controlling portion for controlling an inner pressure in a chamber, for example, including a vane and a slidable resistive element is provided in an evacuation passage and a main valve seal (sealing member) provided in a main valve element is blocked off from radicals and plasma in an evacuation gas.

Patent Document 1: Japanese Patent Application Laid-Open Publication No. H09-178000.
Patent Document 2: Japanese Patent Application Laid-Open Publication No. 2005-9678.
Patent Document 3: Japanese Patent Application Laid-Open Publication No. 2004-286131.

SUMMARY OF INVENTION

Problems to be Solved by the Invention

When a plasma process using a CF gas, an $O_2$ gas and the like is carried out as a vacuum process, radicals and the like in the plasma pass through a valve opening opened at a predetermined opening degree. At this time, the sealing member of the valve element is exposed to the radicals and the like, and thus the sealing member may be deteriorated, leading to degraded sealing performance and generation of particles.

Along with an increase in plasma and radical energy, a relatively expensive completely fluorinated rubber is currently used as a sealing member in order to increase resistance against plasma and radicals. However, because deterioration of the sealing member cannot be avoided, the sealing member has to be replaced once every several months, which leads to increased costs. In addition, because the apparatuses have to be brought down for maintenance in order to replace the sealing members, production throughput is reduced.

In addition, the gate valve configured to block off the sealing member from the plasma and/or the radicals has a configuration where a flow rate controlling portion (control valve element) and a main valve portion (sealing valve element) are integrated with each other, leading to an increase in production costs and maintenance costs of the gate valve.

The present invention has been made in view of the above, and is directed to a sealing valve and a sealing valve with a pressure control capability that enable a long operating life, a decreased production cost, and a decreased maintenance cost of the sealing valves, and a processing apparatus provided with these sealing valves.

Means of Solving the Problems

In order to solve the above problems, a first aspect of the present invention provides a valve provided between a chamber the inside of which may be maintained at reduced pressures and an evacuation apparatus that evacuates the chamber. The valve comprises a first valve body including a first opening and a second opening that permit gaseous communication between the chamber and the evacuation apparatus; a sealing valve element that moves near/away from the second opening so as to open/close the second opening, the sealing valve element being located in the first valve body; a sealing member provided in the sealing valve element so as to seal the second opening when the sealing valve element closes the second opening; a valve element retreat area that is provided in an inner wall portion of the first valve body, the inner wall portion being away from the second opening, and shields the sealing member from an inner space of the first valve body when the sealing valve element is moved away from the second opening to the valve element retreat area; and a first pivot shaft that pivots the sealing valve element so that the sealing valve element may be located in one of the second opening and the valve element retreat area.

A second aspect of the present invention provides a valve according to the first aspect, wherein the first opening is connected to the chamber, and wherein the second opening is connected to the evacuation apparatus.

A third aspect of the present invention provides a valve according to the second or the third aspect, wherein the first pivot shaft is configured to pivot the sealing valve element around a center axis of the first pivot shaft as a pivotal center between a first position corresponding to the second opening and a second position corresponding to the valve element retreat area, and wherein the first pivot shaft is configured to move the sealing valve element located in the first position in both directions along the direction of the center axis of the first pivot shaft and to move the sealing valve element located in the second position in both directions along the direction of the center axis of the first pivot shaft.

A fourth aspect of the present invention provides a valve according to any one of the first through the third aspects, wherein the sealing valve element includes a protection sealing member outside of the sealing member, wherein the protection sealing member has a better radical resistance than the sealing member, and wherein the sealing member has better air-tightness than the protection sealing member.

A fifth aspect of the present invention provides a valve according to the fourth aspect, wherein the first valve body has a concave groove around the second opening of the first valve body in which concave groove the protection sealing member may be housed, and wherein the protection sealing member is housed in the concave groove when the sealing member closes the second opening of the first valve body.

A sixth aspect of the present invention provides a valve according to the fourth or the fifth aspect, wherein the first valve body includes another concave groove in the valve element retreat area in which other concave groove the sealing member may be housed, and wherein the sealing member is housed in the other concave groove when the protection sealing member is in contact with the valve element retreat area.

A seventh aspect of the present invention provides a valve according to any one of the first through the sixth aspects, wherein the first pivot shaft comprises a hollow shaft that houses a guide shaft therein, wherein the hollow shaft is configured to pivot the sealing valve element around a center axis of the hollow shaft as a pivotal center between a first position corresponding to the second opening and a second position corresponding to the valve element retreat area, and wherein the hollow shaft is configured to move the sealing valve element positioned in the first position in both directions along the center axis of the hollow shaft, and move the sealing valve element positioned in the second position in both directions along the center axis of the hollow shaft.

An eighth aspect of the present invention provides a valve according to any one of the first through the seventh aspects, wherein the first valve body includes a fifth opening.

A ninth aspect of the present invention provides a valve according to the eighth aspect, wherein the fifth opening allows gas flowing in from the first opening to flow out therefrom when the second opening is closed.

A tenth aspect of the present invention provides a valve according to any one of the first through the ninth aspects, further comprising a second valve body including a third opening and a fourth opening that enable gaseous communication between the chamber and the evacuation apparatus, the second valve body connecting the first opening with the fourth opening; a control valve element that is in the second valve body to adjust an opening degree of the third opening of the second valve body and does not have a sealing member; and a second pivot shaft that pivots the control valve element to adjust the opening degree of the third opening of the second valve body.

An eleventh aspect of the present invention provides a valve according to the tenth aspect, wherein the first pivot shaft is configured to pivot the sealing valve element around a center axis of the first pivot shaft as a pivotal center between a first position corresponding to the second opening and a second opening corresponding to the valve element retreat area, and wherein the first pivot shaft is configured to move the sealing valve element positioned in the first position in both directions along the center axis of the first pivot shaft, and move the sealing valve element positioned in the second position in both directions along the center axis of the first pivot shaft.

A twelfth aspect of the present invention provides a valve according to the eleventh aspect, wherein the second valve element includes a space that may house the control valve element when the control valve element adjusts an opening degree of the third opening of the second valve body, wherein the second pivot shaft pivots the control valve element around a center axis of the second pivot shaft as a pivotal center between the third opening of the second valve body and the space, and wherein the first and the second pivot shafts are coaxial with each other and the first pivot shaft comprises a hollow shaft with a hollow portion in which the second pivot shaft may be housed.

A thirteenth aspect of the present invention provides a valve according to any one of the tenth through the twelfth aspects, wherein the sealing valve member includes a protection sealing member outside the sealing member, wherein the protection sealing member has a better radical resistance than the sealing member, and wherein the sealing member has a better air-tightness than the protection sealing member.

A fourteenth aspect of the present invention provides a valve according to the thirteenth aspect, wherein the first valve body has a concave groove around the second opening of the first valve body in which concave groove the protection sealing member may be housed, and wherein the protection sealing member is housed in the concave groove when the sealing member closes the second opening of the first valve body.

A fifteenth aspect of the present invention provides a valve according to the thirteenth or the fourteenth aspect, wherein the first valve body includes another concave groove in the valve element retreat area in which other concave groove the sealing member may be housed, and wherein the sealing member is housed in the other concave groove when the protection sealing member is in contact with the valve element retreat area.

A sixteenth aspect of the present invention provides a valve according to any one of the tenth through the fifteenth aspects, wherein at least one of the first valve body and the second valve body includes a fifth opening.

A seventeenth aspect of the present invention provides a valve according to the sixteenth aspect, wherein the fifth opening allows gas flowing in from the third opening of the second valve body to flow out therefrom when the second opening of the first valve body is closed.

An eighteenth aspect of the present invention provides a valve according to any one of the tenth through the seventeenth aspects, wherein the first valve body and the second valve body are detachably coupled with each other.

A nineteenth aspect of the present invention provides a valve according to any one of the first through the ninth aspects, further comprising: a control valve configured to be openable/closable with respect to the first opening of the first valve body; and a second pivot shaft that pivots the control valve element to adjust an opening degree of the first opening.

A twentieth aspect of the present invention provides a processing apparatus comprising a chamber the inside of which may be maintained at vacuum and in which an object to be processed is housed; a processing mechanism for carrying out a plasma process on the object to be processed in the chamber; an evacuation apparatus that evacuates the chamber; and the valve according to any one of the first through the nineteenth aspects, the valve being provided between the chamber and the evacuation apparatus.

A twenty-first aspect of the present invention provides a processing apparatus according to the twentieth aspect, wherein the first valve body includes a fifth opening, wherein the second opening of the first valve body is closed by the sealing valve element when an inside of the first valve body is cleaned, and wherein gas flows through the fifth opening from the inside of the first valve body.

Effects of the Invention

According to an embodiment of the present invention, there is provided a sealing valve and a sealing valve with a pressure control capability that enable a long operating life, a decreased production cost, and a decreased maintenance cost of the sealing valves, and a processing apparatus provided with these sealing valves.

DESCRIPTION OF THE REFERENCE NUMERALS

Figure 1:
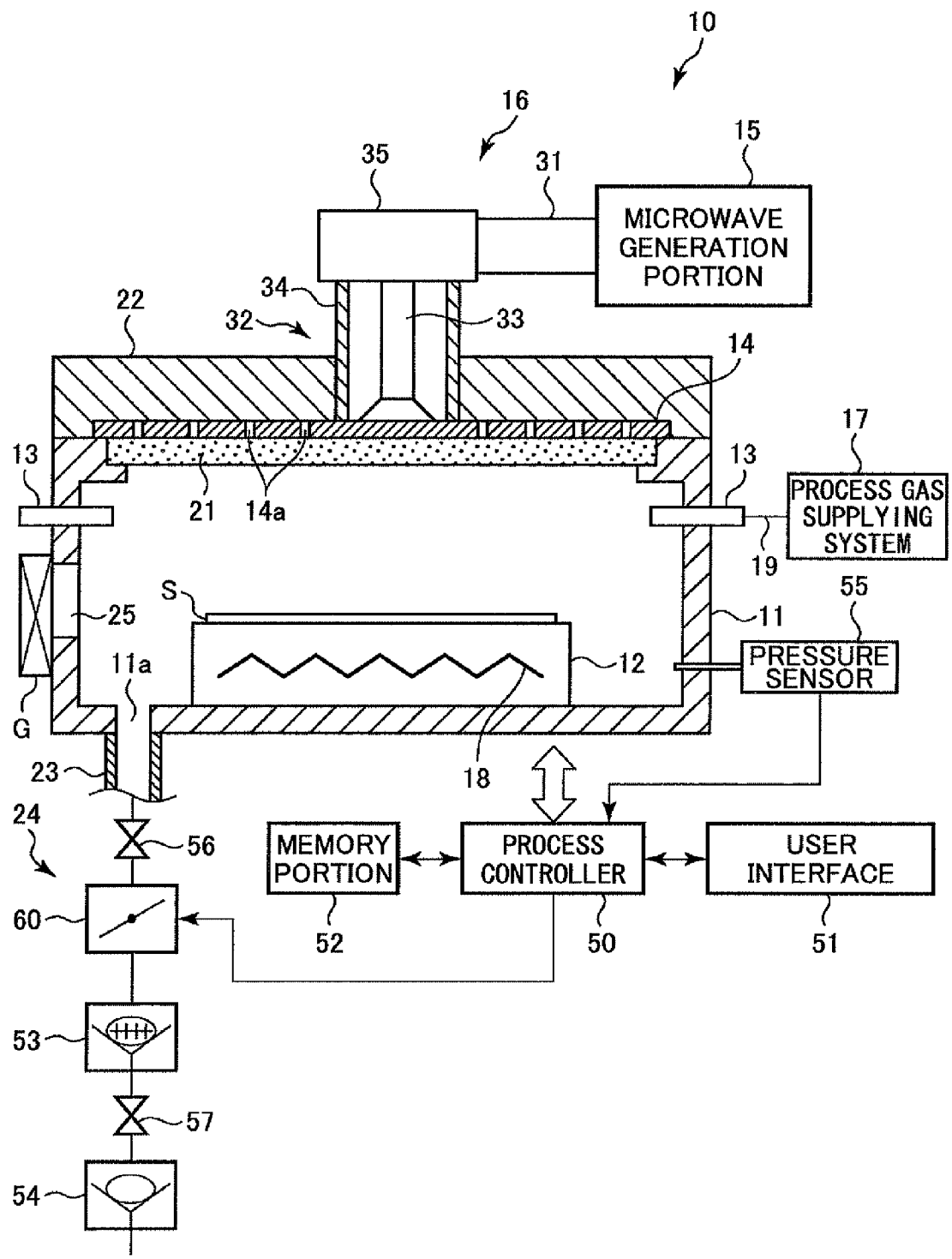
FIG. 1 is a cross-sectional view of a Radial Line Slot Antenna (RLSA) microwave plasma processing apparatus.

11: chamber
53, 54: evacuation apparatus
60: pressure control valve
61, 61-APC, 61-seal: valve body
61a: space
61b, 61c, 61f: openings
61d: valve element retreat area
61d': concave portion
61e: concave groove
62: sealing valve element
62a: sealing member
62b: protection sealing member
63: control valve element
64, 65, 82a: pivot shaft
70: flange
73, 73-APC, 73-seal: evacuation port
80: open/close valve
81: by-pass route
82: guide shaft

MODE(S) FOR CARRYING OUT THE INVENTION

Referring to the accompanying drawings, a valve and a processing apparatus provided with the valve, according to embodiments of the present invention, are explained in the following.

First Embodiment

FIG. 1 is a schematic cross-sectional view of a Radial Line Slot Antenna (RLSA) microwave plasma processing apparatus according to a first embodiment of the present invention.

As shown in FIG. 1, an RLSA microwave plasma processing apparatus 10 includes a substantially cylindrical chamber 11 the inside of which is maintained at vacuum and that houses a semiconductor substrate; a susceptor 12 on which the semiconductor substrate S is placed; a gas introduction portion 13 that is provided in a side wall of the chamber 11 and has a shape of a ring in order to introduce a process gas; a planar antenna 14 that is provided to face an upper opening of the chamber 11 and where plural microwave transmittable holes 14a are formed; a microwave generation portion 15 that generates microwaves; a microwave guidance mechanism 16 that connects the microwave generation portion 15 to the planar antenna 14; and a process gas supplying system 17 that supplies the process gas to the gas introduction portion 13.

A microwave transmittable plate 21 made of a dielectric material is provided below the planar antenna 14, and a shield member 22 is provided above the planar antenna 14. The microwave guidance mechanism 16 includes a waveguide pipe 31 that horizontally extends and guides the microwaves from the microwave generation portion 15, a coaxial waveguide pipe 32 composed of an inner conductor body 33 and an outer conductor body 34 that extend upward from the planar antenna 14, and a mode conversion mechanism 35 provided between the waveguide pipe 31 and the coaxial waveguide pipe 32.

The chamber 11 is provided with an evacuation system 24 composed of a valve, an evacuation apparatus and the like for evacuating the chamber 11. The evacuation system 24 has an evacuation pipe 23 connected to an evacuation port 11a at a bottom portion of the chamber 11. A drag pump 53 as an evacuation apparatus and a dry pump 54 as an evacuation apparatus are connected in series with the evacuation pipe 23. The dry pump 54 evacuates the chamber 11 to rough vacuum, and the drag pump 53 evacuates the chamber 11 to high vacuum.

A pressure control valve 60 is provided upstream of the drag pump 53 in the evacuation pipe 23. A pressure sensor 55 for detecting an inner pressure of the chamber 11 is provided in the chamber 11, and the pressure control valve 60 adjusts its opening degree in accordance with a value detected by the pressure sensor 55. In the evacuation pipe 23, an open/close valve 56 is provided upstream of the pressure control valve 60 and another open/close valve 57 is provided between the drag pump 53 and the dry pump 54.

A transfer opening 25 that allows the semiconductor substrate S to be transferred in/out is provided in the side wall of the chamber 11, and the transfer opening 25 is openable/closable by a gate valve G. In addition, a heater 18 is embedded in the susceptor 12.

The process gas supplying system 17 includes supplying sources of process gases such as CF gas, O2 gas and the like, and has a function of supplying the process gases through a gas supplying line 19 connected to the gas supplying portion 13. The gas supplying line 19 has a flow rate controller including an open/close valve, a mass flow controller (not shown), and the like.

The RLSA microwave plasma processing apparatus 10 includes a process controller 50 including a microprocessor (computer) connected to various constituent parts and components. The parts and components are controlled by the process controller 50. The pressure control valve 60 according to the first embodiment is controlled under instructions of the process controller 50 in accordance with the detected values of the pressure sensor 55. In addition, a user interface 51 composed of a keyboard through which an operator can input commands for managing the RLSA microwave plasma processing apparatus 10, a display that may visually indicate operational statuses of the RLSA microwave plasma processing apparatus 10, and the like is connected to the process controller 50.

In addition, the process controller 50 is connected to a memory portion 52 that stores a control program for carrying out various processes in the RLSA microwave plasma processing apparatus 10 under controls of the process controller 50, and a program or a recipe for causing each constituent portion of the RLSA microwave plasma processing apparatus 10 to carry out corresponding processes. The recipes are stored in a storage medium inside the memory portion 52. The storage medium may be a hard disk, a semiconductor memory, a CD-ROM, a DVD, or a portable memory such as a flash memory. In addition, the recipes may be downloaded from other apparatuses through, for example, a dedicated line.

A predetermined process can be carried out by retrieving a corresponding recipe under an instruction and the like from the user interface 51 and executing the recipe by the process controller 50. The pressure sensor 55 detects an inner pressure of the chamber 11, and an opening degree of the pressure control valve 60 is adjusted through the process controller 50.

Next, a microwave plasma processing method carried out in the RLSA microwave plasma processing apparatus 10 is explained.

First, the semiconductor substrate S is transferred into the chamber 11 and placed on the susceptor 12. Then, while the chamber 11 is evacuated by the evacuation system 24, the process gases such as the CF gas and O2 gas are supplied into the chamber 11 through the gas supplying line 19 and the gas introduction portion 13 in this order, and the inner pressure of the chamber 11 is maintained at a predetermined pressure by the pressure control valve 60. Under these circumstances, an etching process and the like are carried out.

In the RLSA microwave plasma processing apparatus 10 of RLSA microwave plasma scheme, plasma composed mainly of high density radicals with a low electron temperature is generated, thereby enabling low damage plasma processing.

When there are plural processing processes, after one process is completed, a purge gas such as Ar gas is supplied into the chamber 11 from the process gas supplying system 17 while the evacuation is being continued, thereby purging the gases remaining from the previous process out from the chamber 11. Then, a gas for the next process is supplied to the chamber 11, microwave plasma is generated, and the next process is carried out.

Figure 2:
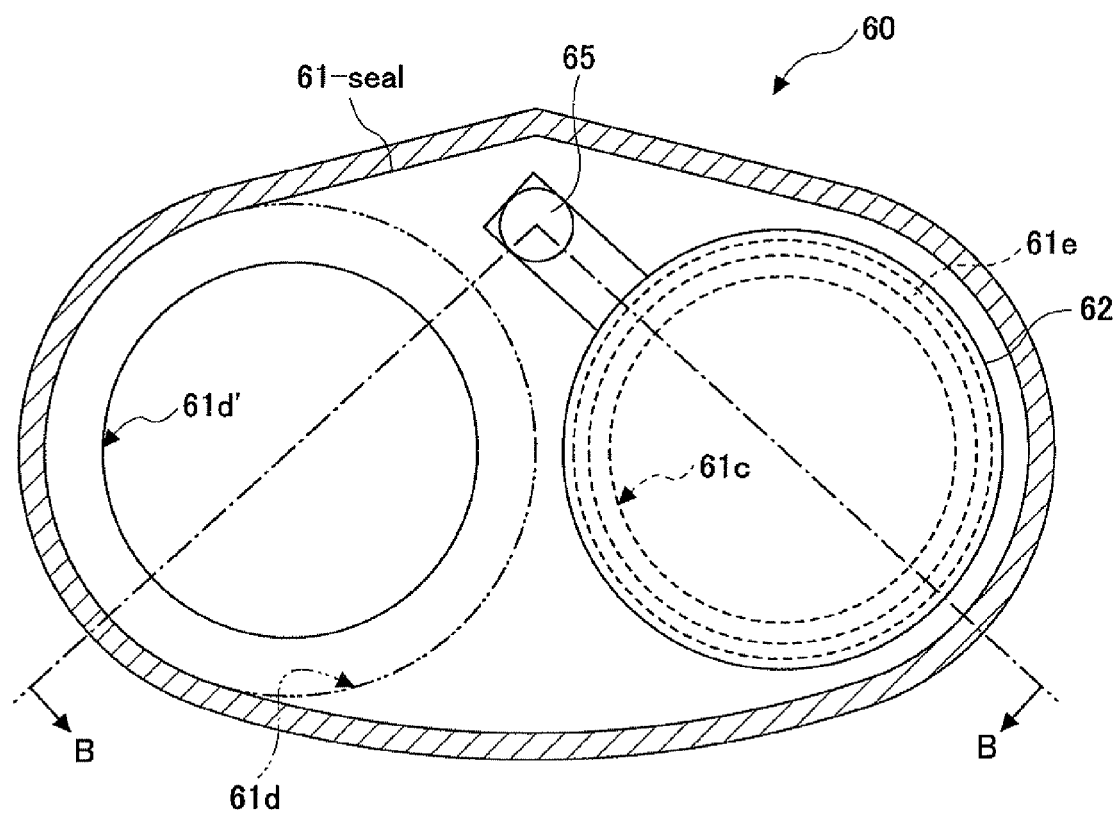
FIG. 2 is a cross-sectional view illustrating a valve according to a first embodiment of the present invention.
Figure 3:
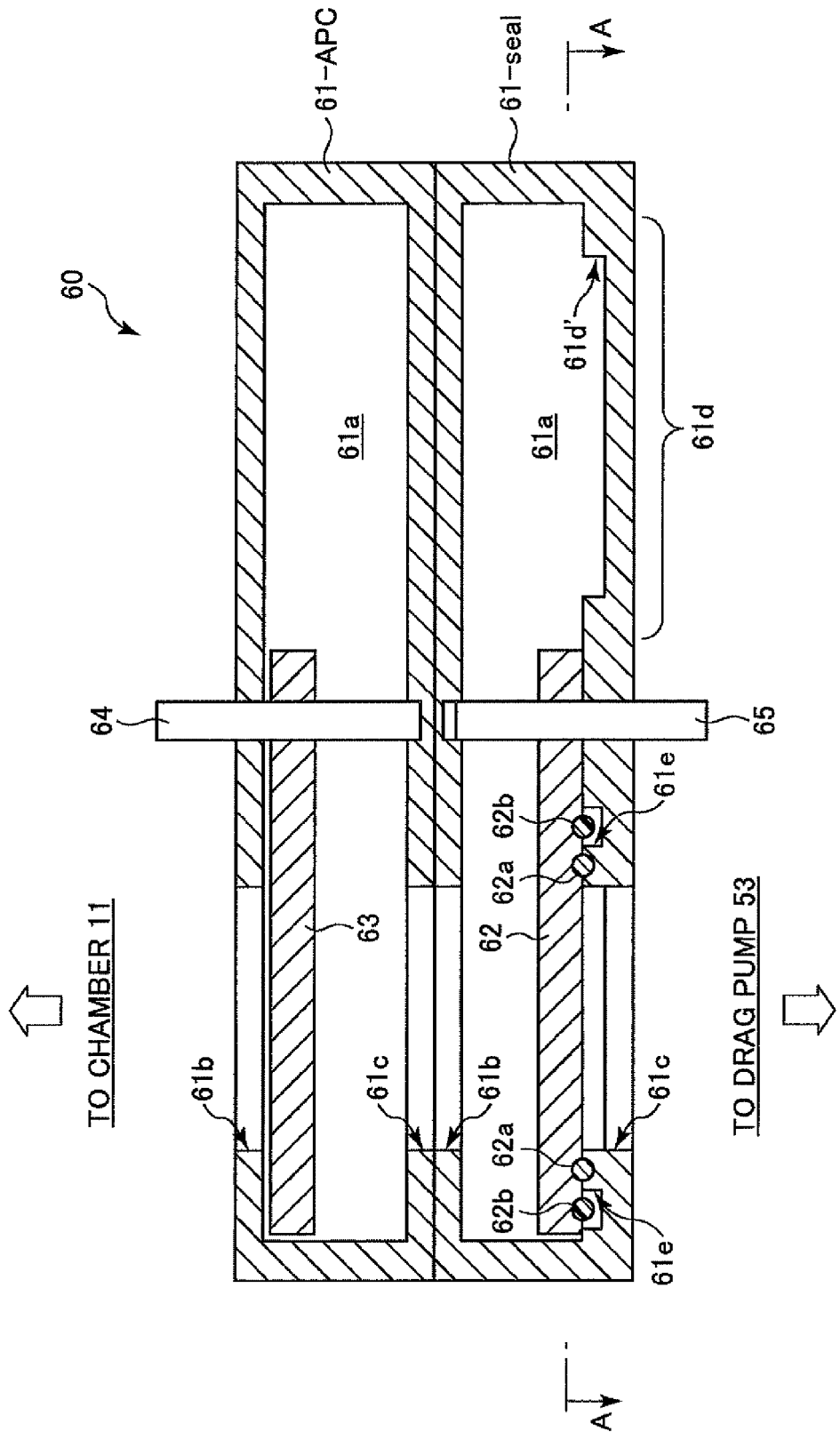
FIG. 3 is a cross-sectional view taken along a B-B line in FIG. 2.
Figure 4:
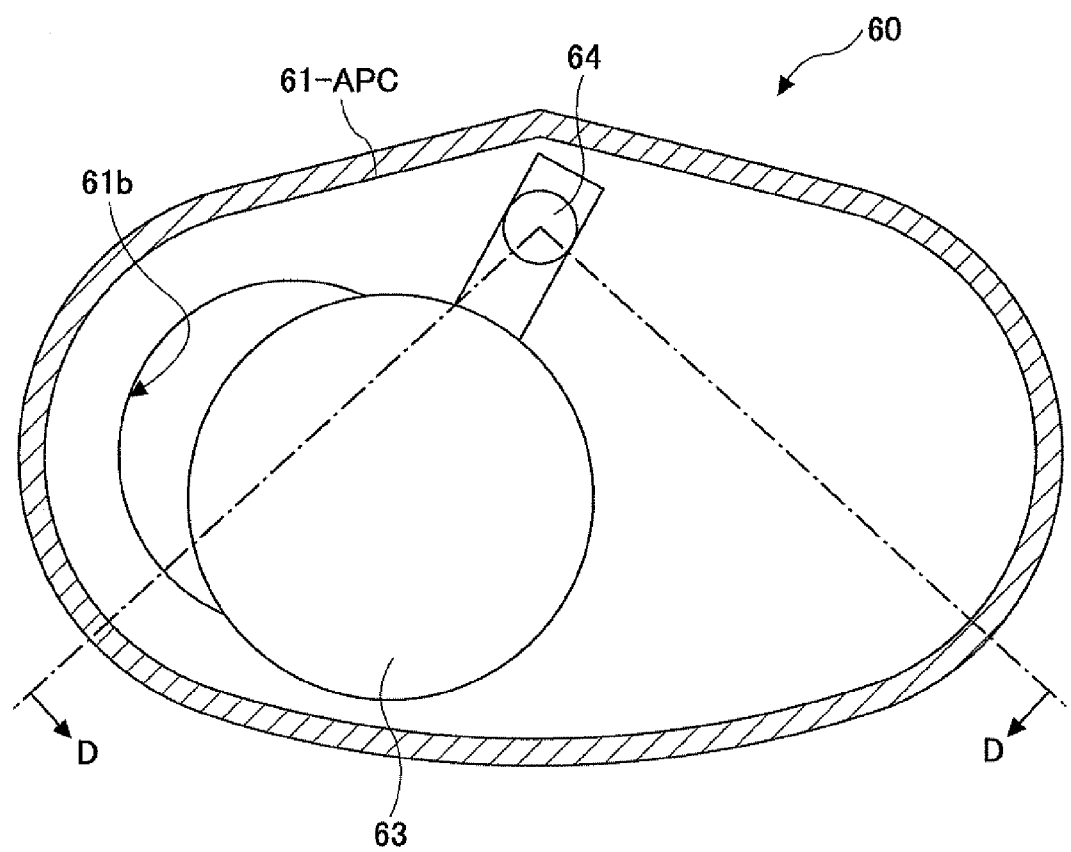
FIG. 4 is a cross-sectional view illustrating a situation where an opening is partly closed by a control valve element.
Figure 5:
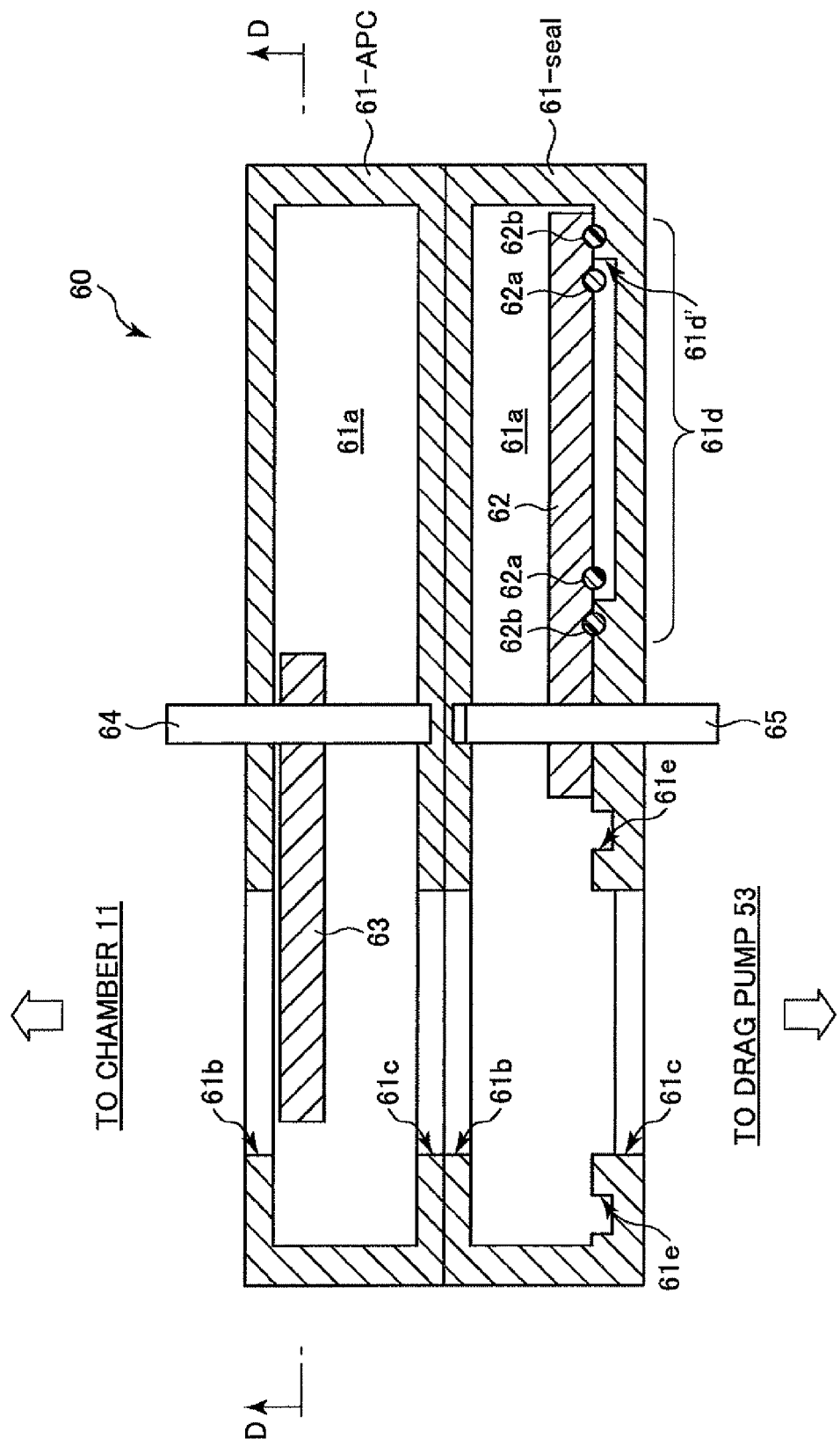
FIG. 5 is a cross-sectional view take along a D-D line in FIG. 4.

FIG. 2 is a cross-sectional view taken along an A-A line in FIG. 3, illustrating a configuration of the pressure control valve 60 according to the first embodiment, where an opening is closed by a sealing valve element. FIG. 3 is a cross-sectional view taken along a B-B line in FIG. 2. FIG. 4 is a cross-sectional view taken along a D-D line in FIG. 5, where an opening is partly closed by a control valve element. FIG. 5 is a cross-sectional view taken along a D-D line in FIG. 4.

As shown in FIGS. 2 and 3, the pressure control valve 60 according to the first embodiment includes a valve body 61-APC and a valve body 61-seal. The valve body 61-APC and the valve body 61-seal include spaces 61a and openings 61b, 61c that oppose each other. The opening 61b of the valve body 61-APC is connected to the chamber 11, and the opening 61c of the valve body 61-seal is connected to the drag pump 53, thereby allowing gaseous communication between the chamber 11 and the drag pump 53. In addition, a valve element retreat area 61d is provided at a position in a wall portion of the valve body 61-seal where the opening 61c is formed, the position being away from the opening 61c, and includes a circular concave portion 61d' in the center of the valve element retreat area 61d. Outside the opening 61c, there is a concave groove 61e concentric to the opening 61c.

A control valve element 63 is provided inside the valve body 61-APC, and a sealing valve element 62 is provided inside the valve body 61-seal. The sealing valve element 62 has a shape of circular plate, and double annular grooves are formed along a circumference in one surface of the sealing valve element 62. A sealing member 62a is fitted into the inner groove, and a protection sealing member 62b is fitted into the outer groove. The protection seal 62b has a better radical resistance than the sealing member 62a does, and the sealing member 62a provides, a better air-tightness than the protection seal member 62b does.

The control valve element 63 has a shape of a circular plate, similar to the sealing valve element 62, but does not have any sealing members.

The valve body 61-APC is provided at a central upper portion of the valve body 61-APC with a first pivot shaft 64 to which the control valve element 63 is attached, as shown in FIG. 3. The first pivot shaft 64 is connected to a driving portion such as a motor (not shown) that rotates the first pivot shaft 64, which in turn is able to pivot the control valve element 63.

Also in the valve body 61-seal, there is provided a pivot shaft 65 in the upper center of the valve body 61-seal (FIG. 2), and the sealing valve element 62 is attached to the pivot shaft 65. The pivot shaft 65 is also connected to a driving portion (not shown) such as a motor that pivots the pivot shaft 65.

The pivot shaft 65 pivots the sealing valve element 62 around a center axis of the pivot shaft 65 as a pivotal center in order to alternatively move the sealing valve element 62 to a position corresponding to the opening 61*c* (e.g., above the opening 61*c*), shown in FIG. 3, and a position corresponding to the valve element retreat area 61*d* (e.g., above the valve element retreat area 61*d*), shown in FIG. 5. In addition, the pivot shaft 65 is movable in both directions along the center axis direction of the pivot shaft 65 by a linear actuator such as a solenoid. With this, the pivot shaft 65 can move the sealing valve element 62 close to or away from the opening 61*c* along the center axis direction of the pivot shaft 65 when the sealing valve element 62 is in the position corresponding to the opening 61*c*. The pivot shaft 65 can move the sealing valve element 62 close to or away from the valve element retreat area 61*d* along the center axis of the pivot shaft 65 when the sealing valve element 62 is in the position corresponding to the valve element retreat area 61*d*.

When the sealing valve element 62 moves to the position corresponding to the opening 61*c* and proceeds toward the opening 61*c*, the sealing member 62*a* is in firm contact with an area surrounding the opening 61*c*. With this, the protection sealing member 62*b* is housed in the concave groove 61*e* provided concentrically to the opening 61*c*.

When the sealing valve element 62 recedes from the opening 61*c* and moves away from the opening 61*c*, the sealing valve element 62 can be pivoted to the position corresponding to the valve element retreat area 61*d*. When the sealing valve element 62 proceeds toward the valve element retreat area 61*d*, the protection sealing valve member 62*b* is in firm contact with the valve element retreat area 61*d*, as shown in FIG. 5. With this, the sealing member 62*a* is housed in the concave portion 61*d'* provided in the center of the valve element retreat area 61*d*.

Incidentally, the valve element retreat area 61*d* may be provided with an annular groove in which the sealing member 62*a* is housed, instead of the concave portion 61*d'*.

The pivot shaft 64 allows the control valve element 63 to be openable/closable with respect to the opening 61*b* by pivoting the control valve element 63 between the opening 61*b* and the space 61*a* around the center axis of the pivot shaft 64. Namely, the pivot shaft 64 moves the control valve element 63 from a position where the opening 61*b* is fully closed by the control valve element 63 through a position where the opening 61*b* is fully opened, so that an opening degree of the opening 61*b* can be adjusted. FIG. 4 illustrates that the opening 61*b* is slightly opened by the control valve element 63.

When a plasma process is carried out in the RLSA microwave plasma processing apparatus 10 shown in FIG. 1, the pivot shaft 65 of the pressure control valve 60 moves the sealing valve element 62 to the valve element retreat area 61*d*. During the plasma process, an opening degree of the opening 61*b* is adjusted by the control valve element 63 while the chamber 11 is evacuated by the drag pump 53, so that the chamber 11 is maintained at a desired pressure.

The pivot shaft 64 is pivoted to open the control valve element 63. By pivoting the pivot shaft 64, the control valve element 63 is pivoted so that the opening 61*b* is maintained at a predetermined opening degree. Incidentally, the pivot shaft 64 is not movable along the center axis and thus cannot move the control valve element 63 in the center axis direction of the pivot shaft 64 in this embodiment. However, the pivot shaft 64 may be movable in both directions along the center axis direction of the pivot shaft 64, similar to the pivot shaft 65, thereby moving the control valve element 63 in both directions along the center axis direction of the pivot shaft 64. In this case, the pivot shaft 64 can move the control valve element 63 away from the opening 61*b*, pivot the control valve element 63 in order that the opening 61*b* has a predetermined opening degree, and move the control valve element 63 toward the opening 61*b* into firm contact with the opening 61*b*.

Plasma and/or radicals flow from the opening 61*b* opened at a predetermined opening degree by the control valve element 63 to the opening 61*c*. In the control valve element 63, there are no sealing members that tend to be deteriorated by plasma and/or radicals.

On the other hand, the sealing valve element 62 having the sealing member 62*a* is moved to the valve element retreat area 61*d*. Additionally, the protection sealing member 62*b* is pressed onto the valve element retreat area 61*d* (an area surrounding the concave portion 61*d'*), and the sealing member 62*a* is inside the concave portion 61*d'* of the valve element retreat area 61*d* without being pressed onto a bottom surface of the concave portion 61*d'*. Because the protection sealing member 62*b* is pressed onto the valve element retreat area 61*d*, the sealing member 62*a* is air-tightly sealed and blocked off from the plasma and/or radicals, thereby preventing deterioration. Although the protection sealing member 62*b* is slightly affected by the plasma and/or radicals, because the protection sealing member 62*b* only functions to seal the sealing member 62*a*, the protection sealing member 62*b* does not cause a problem when sealing the sealing member 62*a*, even if deteriorated.

The pressure control valve 60 according to the first embodiment of the present invention includes the valve element retreat area 61*d* to which the sealing valve element 62 that has moved away from the opening 61*c* can retreat at the position in the wall portion of the valve body 61-seal where the opening 61*c* is formed, the position being away from the opening 61*c*. When the sealing valve element 62 retreats to the valve element retreat area 61*d*, the sealing member 62*a* is blocked off from the space 61*a*. Specifically, when the sealing valve element 62 retreats to the valve element retreat area 61*d*, the sealing member 62*a* is housed in the concave portion 61*d'* provided in the valve element retreat area 61*d*, and sealed by the protection sealing member 62*b* provided outside the sealing member 62*a*.

According to the pressure control valve 60 of the first embodiment, because the sealing valve element 62 can retreat to the valve element retreat area 61*d* and block off the sealing member 62*a* from the space 61*a* of the valve body 61-seal, the sealing member 62*a* is prevented from being exposed to the plasma and/or radicals in the plasma, thereby achieving a longer operating life of the sealing member 62*a*.

In addition, according to the first embodiment, the following advantages are obtained.

The pressure control valve 60 according to the first embodiment includes the valve body 61-APC housing the control valve element 63 and the valve body 61-seal housing the sealing valve element 62, and these bodies are detachably coupled. Therefore, when a ready-made valve is prepared instead of the pressure control portion of the pressure control valve 60 and coupled with the valve body 61-seal, the pressure control valve with the long operating life sealing member 62*a* may be produced at lower costs.

Figure 6:
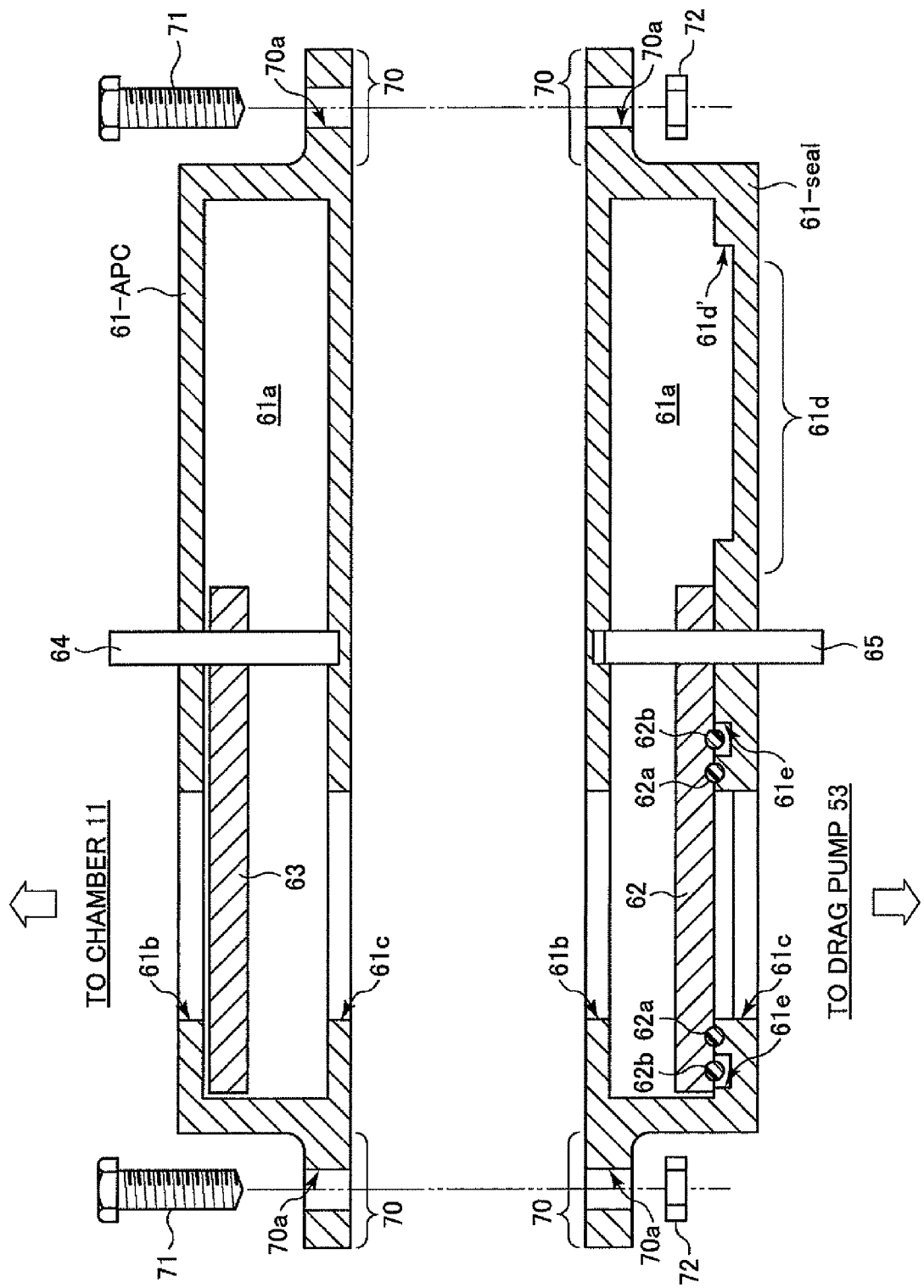
FIG. 6 is a cross-sectional view illustrating another example of the valve according to the first embodiment of the present invention.

For example, while a pendulum valve is employed as the pressure control portion (APC) in the first embodiment, different valves such as a butterfly valve may be employed. As an example of detachably coupling the valve body 61-APC and the valve body 61-seal, as shown in FIG. 6, flanges 70 are provided in the valve body 61-APC and the valve body 61-seal, coupling portions 70*a*, for example, holes are made in the flanges 70, and the valve body 61-APC and the valve body 61-seal are coupled by connecting bolts 71 and nuts 72 through the holes. Not being limited to such coupling, an annular groove is provided around the opening 61c on an outer surface of the valve body 61-APC and a sealing member such as an O-ring is fitted into the annular groove, and another annular groove is provided around the opening 61c on an outer surface of the valve body 61-seal and a sealing member such as an O-ring is fitted into this annular groove, so that the valve body 61-APC and the valve body 61-seal may be airtightly coupled using the two sealing members and a cylindrical member with flanges.

In addition, because the operating life of the sealing member 62a is increased in the first embodiment, the sealing members 62a need to be relatively less frequently replaced, thereby decreasing the running cost of a processing apparatus where the plasma and/or radicals flow through a pressure control valve, for example, the RLSA microwave plasma processing apparatus 10. Moreover, inspection and repair can be carried out at the time of regular inspection and the like only by removing either one of the valve body 61-APC and the valve body 61-seal, thereby facilitating maintenance of the processing apparatus and decreasing the maintenance cost.

Second Embodiment

Figure 7:
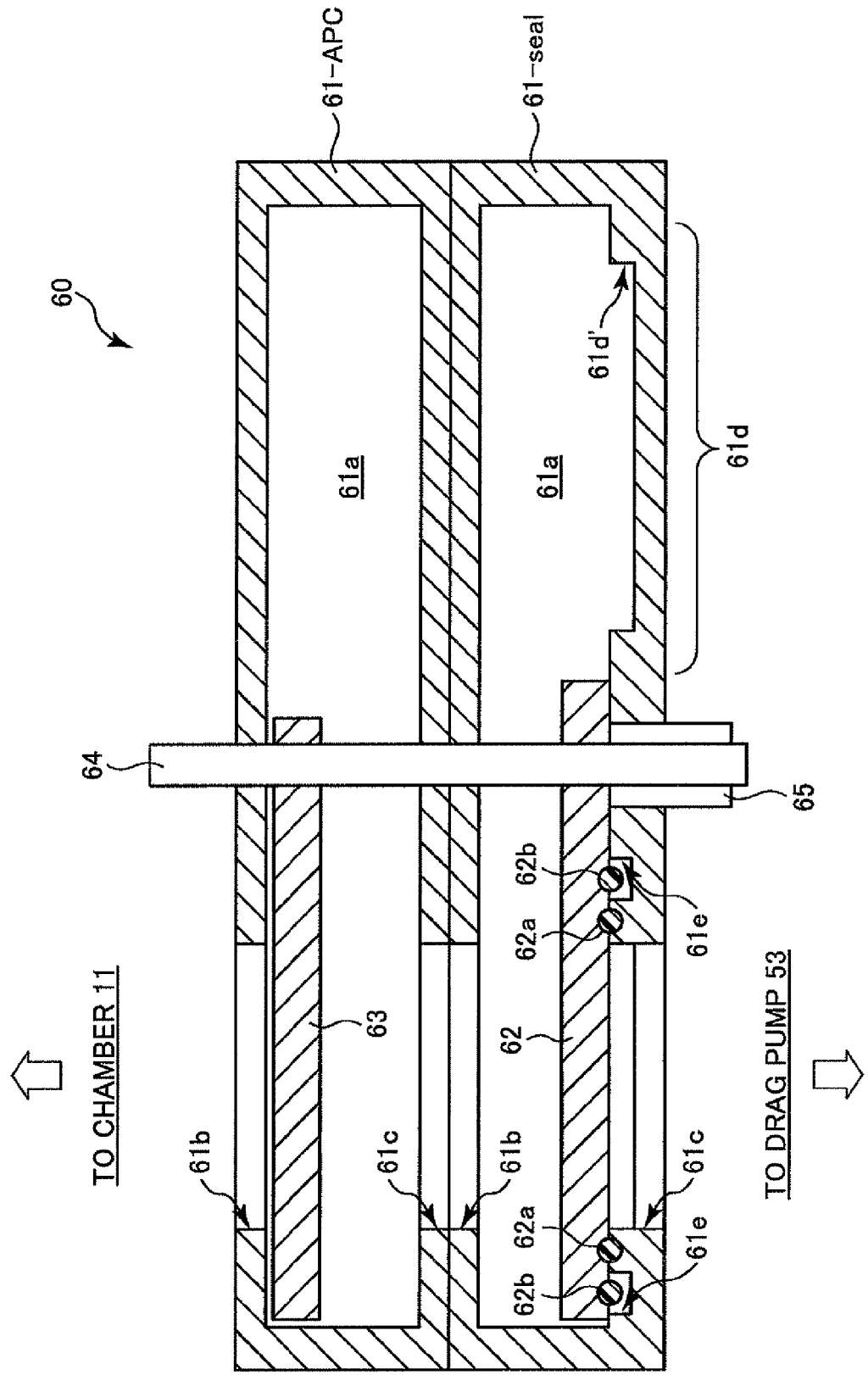
FIG. 7 is a cross-sectional view illustrating a valve according to a second embodiment of the present invention.

FIG. 7 is a cross-sectional view illustrating a configuration of a pressure control valve 60 according to a second embodiment. This cross section corresponds to a cross section taken along the B-B line in FIG. 2 that illustrates a situation where the opening is sealed by the sealing valve element. As shown in FIG. 7, the second embodiment is different from the first embodiment in that the pivot shaft 64 is coaxial with the pivot shaft 65.

In the pressure control valve 60 according to the second embodiment, both portions of a pressure control portion and a sealing portion are pendulum valves. The control valve element 63 is attached to the pivot shaft 64 and pivoted between the opening 61b of the valve body 61-APC and the space 61a around the center axis of the pivot shaft 64 as a pivotal center.

The sealing valve element 62 is attached to the pivot shaft 65. The pivot shaft 65 is a hollow shaft with a hollow portion where the pivot shaft 64 is pivotably housed. The pivot shaft 65 is also pivotably while pivotably housing the pivot shaft 64 in the hollow portion, and movable in both directions along the center axis of the pivot shaft 65 by an actuator such as a solenoid. Other configurations are substantially the same as the first embodiment. Therefore, in FIG. 7, the same reference symbols are given to the same portions in FIG. 3, and repetitive explanations are omitted.

According to the second embodiment, the same advantages as the first embodiment are obtained. In addition, because the pivot shaft 64 is coaxial with the pivot shaft 65, the second embodiment is advantageous in that a motor for driving the pivot shaft 64 and the pivot shaft 65 are arranged in, for example, one side of the pressure control valve 60 (the valve body 61-seal).

Incidentally, while the pivot shaft 64 is coaxial with the pivot shaft 65 in the second embodiment, the valve body 61-APC and the valve body 61-seal may be detachably coupled with each other, in the same manner as the first embodiment. For example, the flanges 70 having the coupling portions 70a are provided in the valve body 61-APC and the valve body 61-seal, and the valve body 61-APC and the valve body 61-seal are coupled by connecting the bolts 71 and the nuts 72 through the holes.

In this case, inspection and repair can be carried out at the time of regular inspection and the like only by removing the valve body 61-APC or the valve body 61-seal even when the pivot shaft 64 is coaxial with the pivot shaft 65. Therefore, maintenance of the processing apparatus can be facilitated, and a maintenance cost can be decreased, in the same manner as the first embodiment.

Third Embodiment

Figure 8:
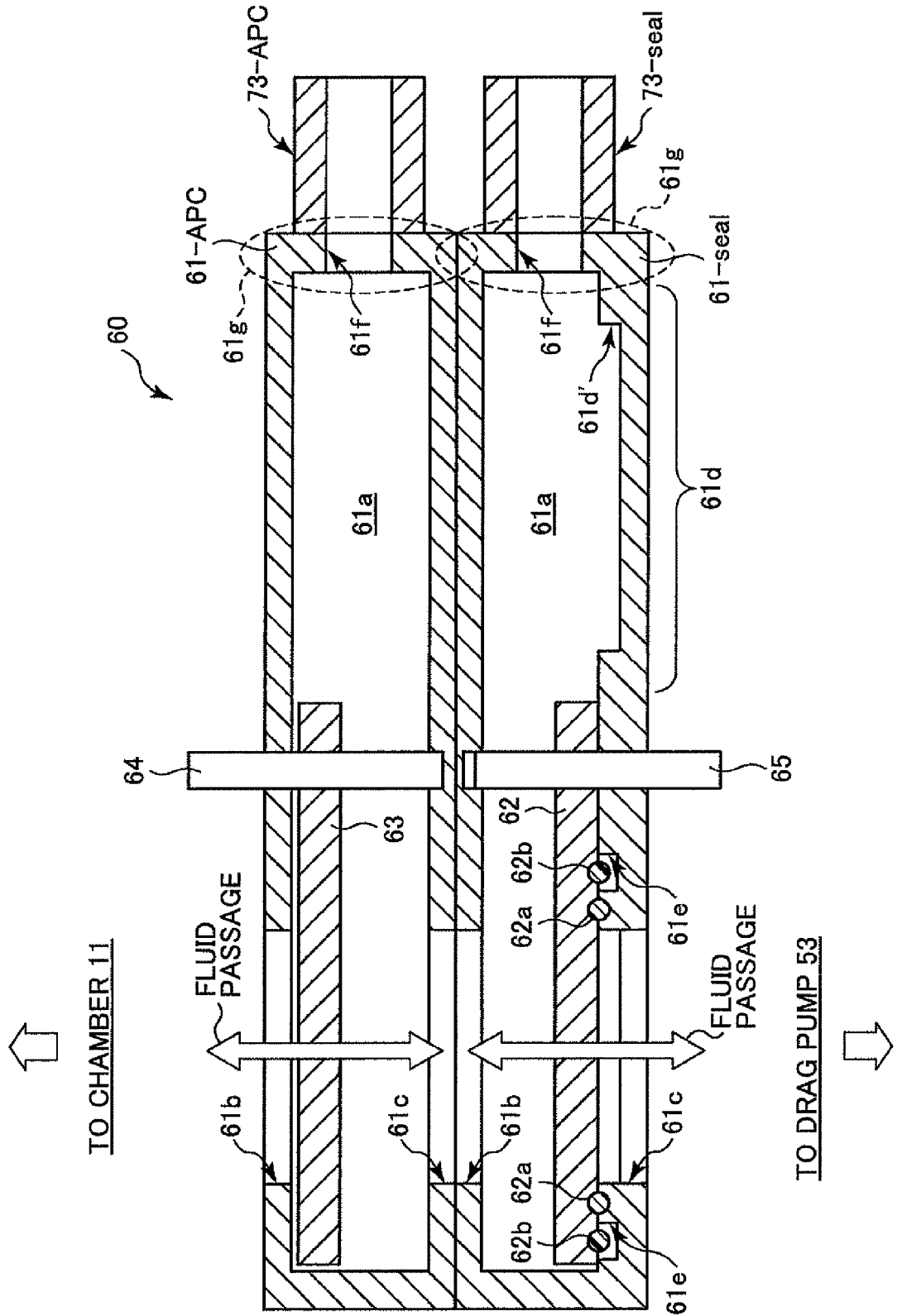
FIG. 8 is a cross-sectional view illustrating a valve according to a third embodiment of the present invention.

FIG. 8 illustrates a configuration of a pressure control valve 60 according to a third embodiment, and is a cross-sectional view corresponding to the cross section taken along the B-B line in FIG. 2 that illustrates a situation where the opening is sealed by the sealing valve element.

As shown in FIG. 8, the third embodiment is different from the second embodiment in that an opening 61f is provided in one of the valve body 61-APC and the valve body 61-seal or both. The openings 61f are provided in both the valve body 61-APC and the valve body 61-seal in the illustrated example.

The openings 61f are formed away from the fluid passage that connects the opening 61b and the opening 61c. For example, the openings 61f are provided in a wall portion defining the space 61a provided away from the fluid passage in a direction intersecting the extending direction of the fluid passage. Specifically, the openings 61f are provided in a wall portion 61g that is in parallel with the fluid passage and the farthest away from the fluid passage in the direction intersecting the extending direction of the fluid passage.

Figure 9:
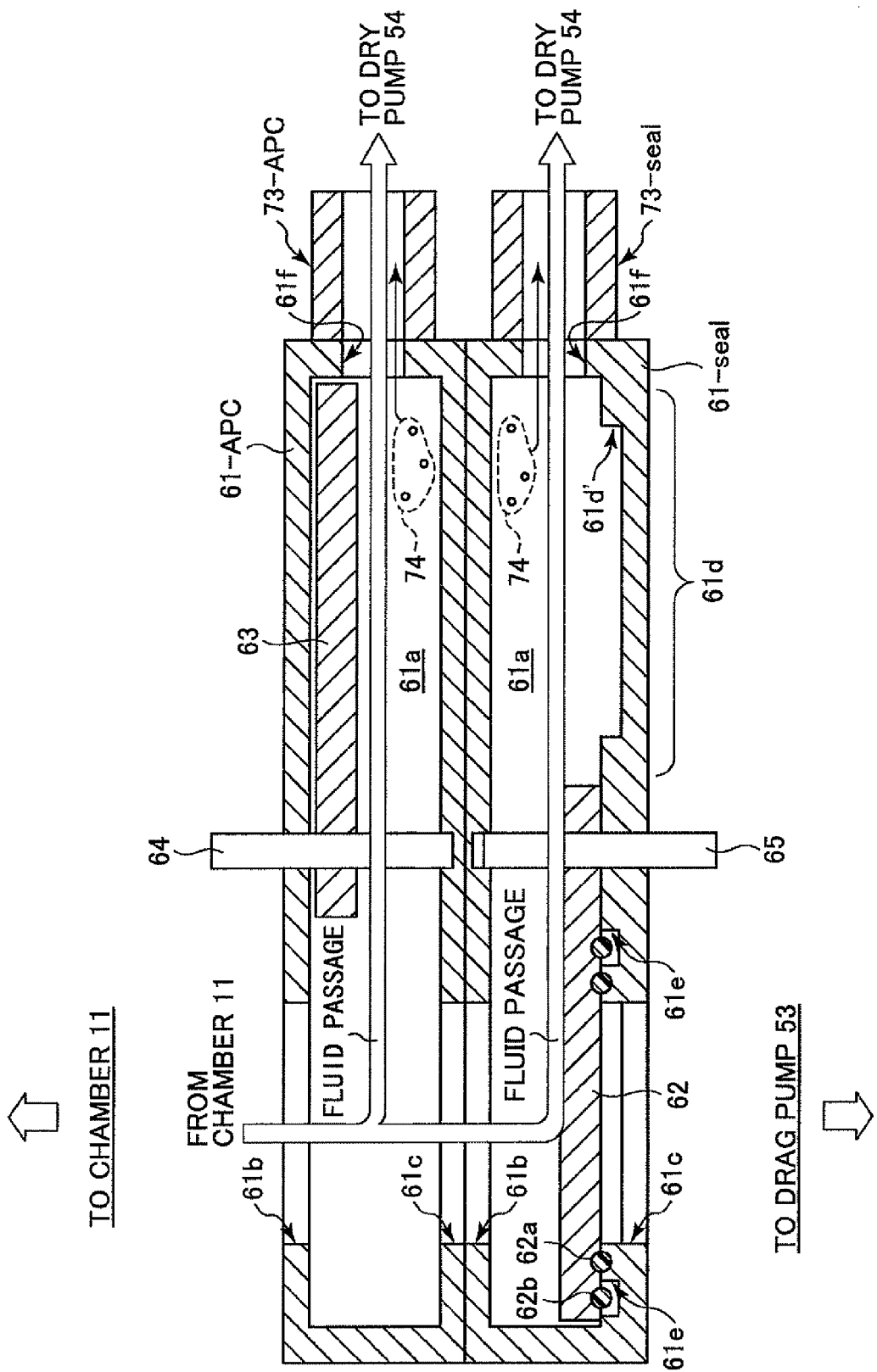
FIG. 9 is a cross-sectional view illustrating an example of cleaning.

Referring to FIG. 9, the opening 61f of the valve body 61-APC is connected to an evacuation port 73-APC, and the opening 61f of the valve body 61-seal is connected to an evacuation port 73-seal, which allow gas flowing in from the opening 61b of the valve body 61-APC to be evacuated through the openings 61f. The openings 61f may be used as openings for use in connecting bypass valves, for example, when the opening 61c of the valve body 61-seal is sealed by the sealing valve element 62.

In addition, the openings 61f may provide cleaning paths when cleaning insides of the valve body 61-APC and the valve body 61-seal.

For example, in the case of the pendulum valve having the space 61a, which is used as a pressure control valve in this embodiment, because the space 61a is away from the fluid passage, the fluid may be stagnant in the space 61a. If the fluid is stagnant, particles 74 may remain in the space 61a.

In this regard, because the opening 61f is provided in at least one of the valve body 61-APC and the valve body 61-seal, or both in the illustrated example in the third embodiment, the spaces 61a can be cleaned using the openings 61f. Therefore, according to the third embodiment, cleaning performance is improved, and particles 74 are prevented from being built up, thereby providing an advantage of an increased yield in semiconductor device fabrication.

Figure 10:
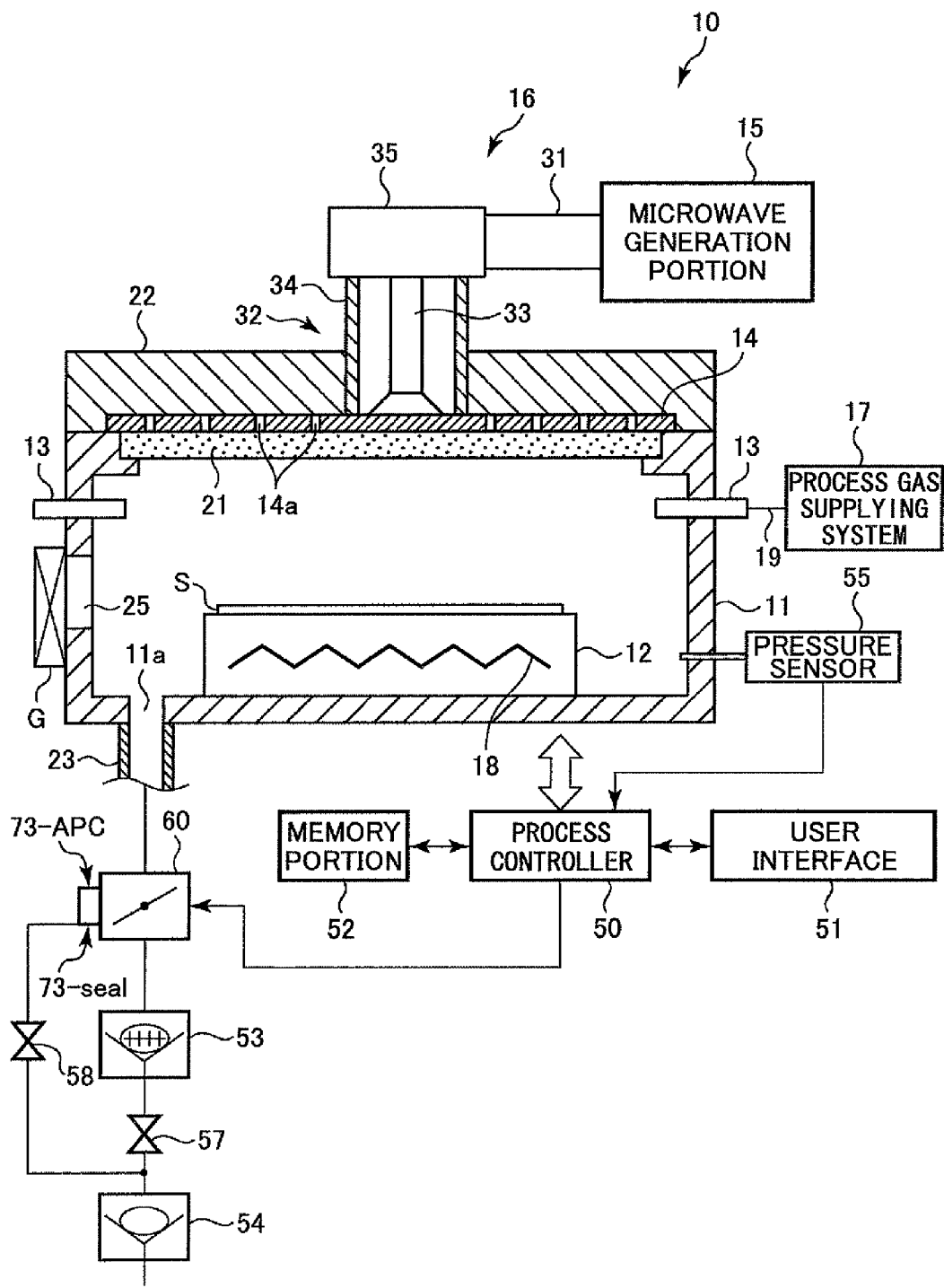
FIG. 10 is a schematic cross-sectional view of a RLSA microwave plasma processing apparatus that employs the valve according to the third embodiment.

FIG. 9 is a cross-sectional view illustrating an example of cleaning in the pressure control valve according to the third embodiment of the present invention, and FIG. 10 is a schematic cross-sectional view of the RLSA microwave plasma processing apparatus employing the pressure control valve according to the third embodiment of the present invention.

As shown in FIG. 9, at the time of cleaning, the opening 61c of the valve body 61-seal is sealed by the sealing valve element 62, thereby blocking off the fluid passage from the pressure control valve 60 to the drag pump 53 shown in FIG. 10. In the RLSA microwave plasma processing apparatus 10 shown in FIG. 10, the evacuation port 73-APC and the evacuation port 73-seal of the pressure control valve 60 are connected to the dry pump 54 via an open/close valve 58. When the purge gas such as Ar, N2 and the like is supplied to the chamber 11 from the process gas supplying system 17 (FIG. 10) and the dry pump 54 is activated with the open/close valve 58 opened, the purge gas flows along a fluid path from the opening 61b of valve body 61-APC to the openings 61f through the space 61a of the valve body 61-APC and the space 61a of the valve body 61-seal. When this fluid path going through the space 61a is produced at the time of cleaning, the spaces 61a are cleaned with higher cleaning performance. Specifically, because the openings 61f are provided in the wall portions 61g (FIG. 8) that are the farthest away from the openings 61b, 61c, the fluid path is produced along the sealing valve element 62 and the control valve element 63. Therefore, the cleaning performance with respect to the sealing valve element 62 and the control valve element 63 is also improved.

As stated, according to the third embodiment, the same advantages as the first embodiment are obtained. In addition, because the openings 61f are provided away from the fluid passage from the opening 61b to the opening 61c in the spaces 61a, the cleaning performance with respect to not only the spaces 61a but also the sealing valve element 62 and the control valve element 63 can be improved. Therefore, the insides of the valve body 61-APC and the valve body 61-seal are maintained to be a clean environment.

Incidentally, in the third embodiment, the valve body 61-APC and the valve body 61-seal may be detachably coupled in the same manner as the first embodiment. For example, the flanges 70 are provided respectively in the sealing valve element 62 and the control valve element 63, and the valve body 61-APC and the valve body 61-seal are coupled by connecting the flanges 70 with the bolts 71 and the nuts 72, as shown in FIG. 6.

In addition, the third embodiment may be practiced in combination with the second embodiment, or the first embodiment and the second embodiment.

In these cases, the pressure control valve having advantages of the second embodiment, or the first embodiment and the second embodiment can be obtained.

Fourth Embodiment

Figure 11:
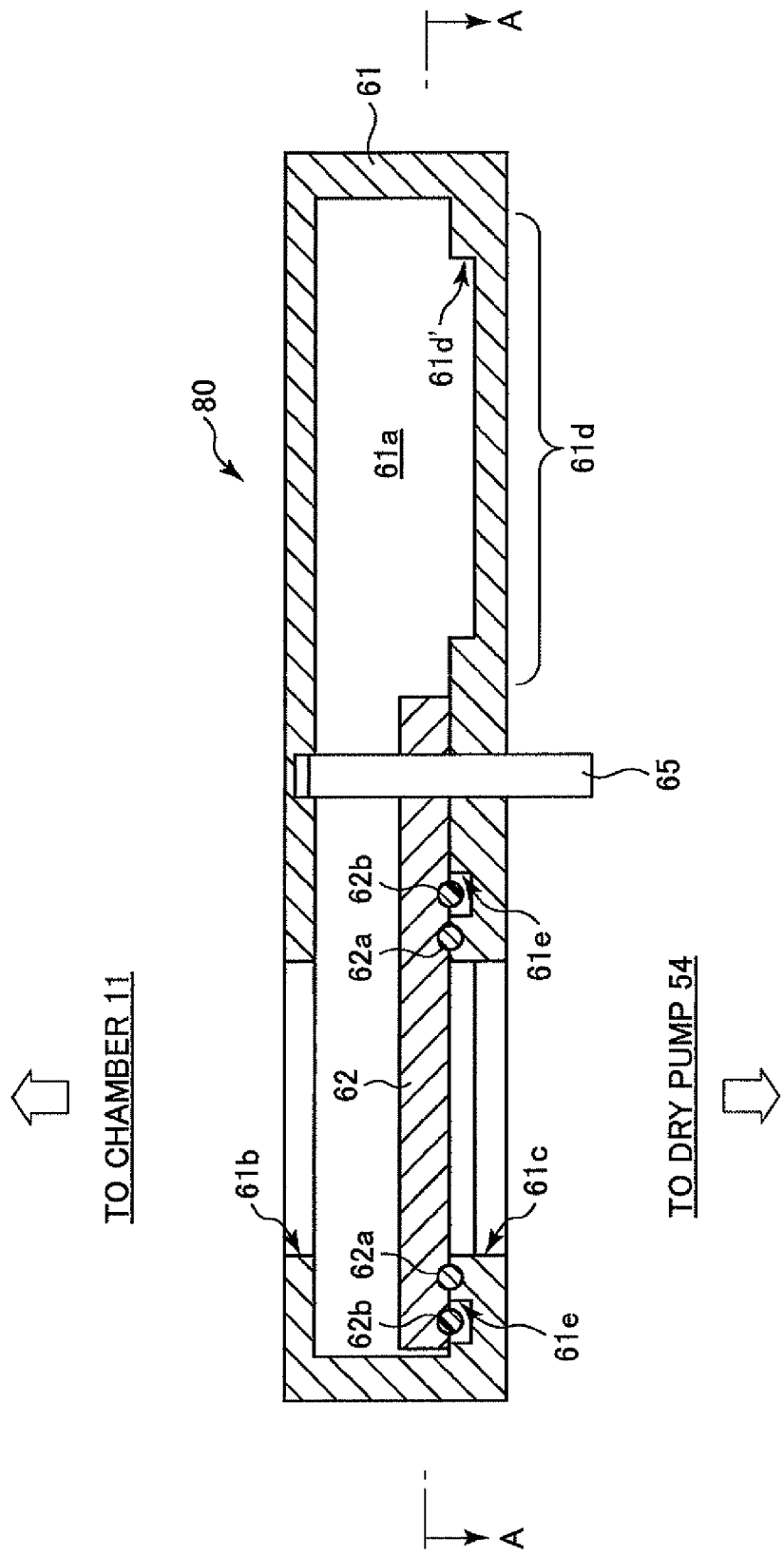
FIG. 11 is a cross-sectional view illustrating a valve according to a fourth embodiment.
Figure 12:
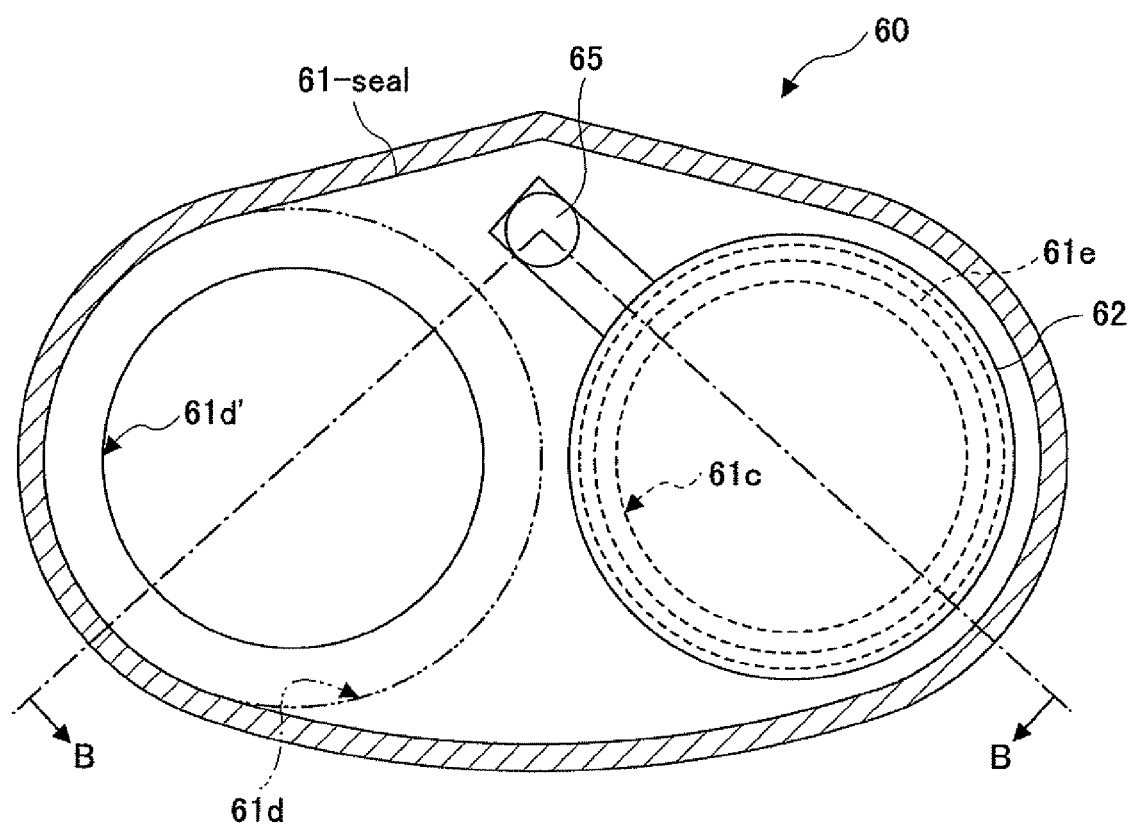
FIG. 12 is a cross-sectional view illustrating a situation where an opening is closed by a sealing valve element.
Figure 13:
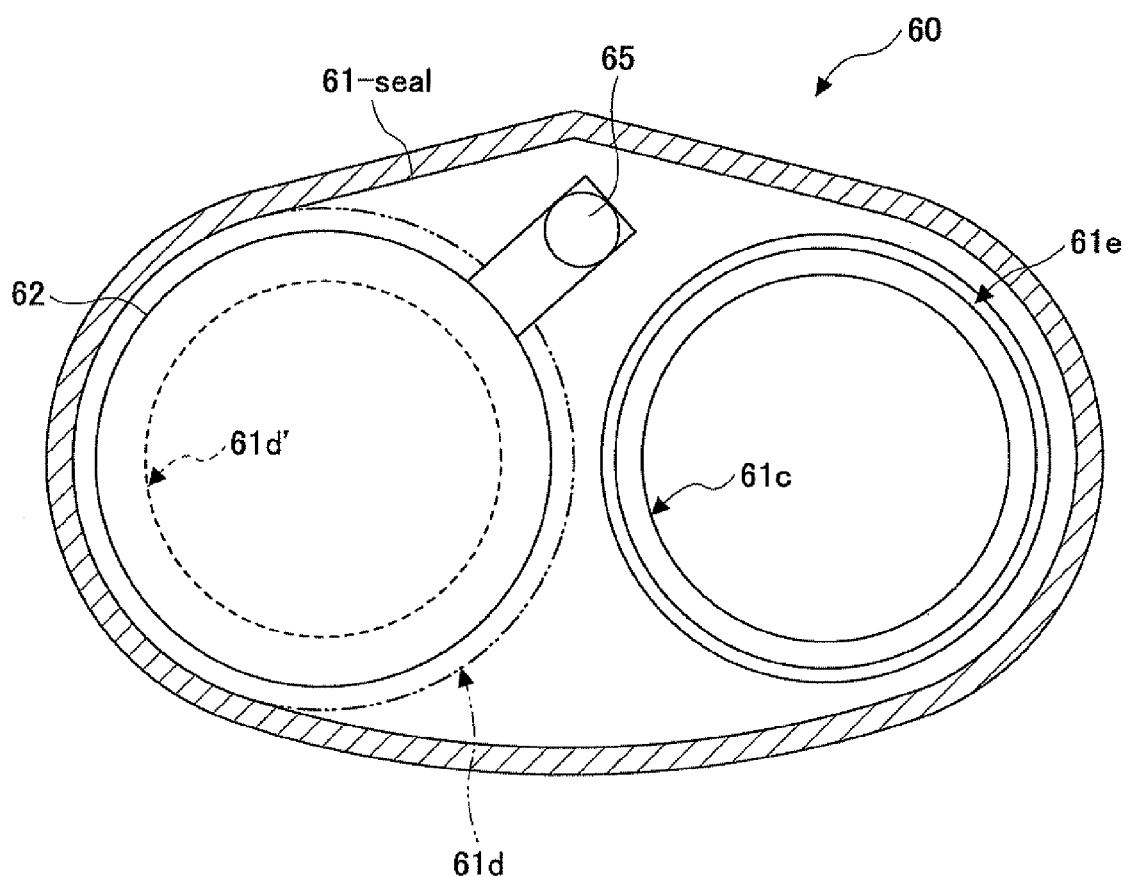
FIG. 13 is a cross-sectional view illustrating a situation where the opening is fully opened.

FIG. 11 illustrates a configuration of a sealing valve 80 according to a fourth embodiment. FIG. 11 is a cross-sectional view corresponding to a cross section along a B-B line in FIG. 12 that illustrates a case where the opening 61c is sealed by the sealing valve element 62. FIGS. 12 and 13 are cross-sectional views corresponding to cross sections taken along an A-A line in FIG. 11. Specifically, FIG. 13 illustrates a case where the opening 61c is fully opened.

As shown in FIGS. 11 through 13, the sealing valve 80 can be obtained using the sealing valve portion of the pressure control valve 60 explained in the first through the third embodiments.

The sealing valve 80 has the same configuration as the sealing valve portion of the pressure control valve according to the first embodiment, and operates in the same manner. Therefore, in FIGS. 11 through 13 illustrating the sealing valve 80 according to the fourth embodiment, the same reference symbols used in FIGS. 2 through 5 are given to the same portions, and repetitive explanations are omitted.

The sealing valve 80 according to the fourth embodiment is provided with the valve element retreat area 61d in a wall portion adjacent to the opening 61c of the valve body 61-seal, in the same manner as the sealing valve portion of the pressure control valve 60 explained in the first embodiment.

Also in the fourth embodiment, when the sealing valve element 62 retreats to the valve element retreat area 61d, the sealing member 62a is blocked off from the space 61a. Namely, when the sealing valve element 62 retreats to the valve element retreat area 61d, the sealing member 62a is housed in the concave portion 61d' provided in the valve element retreat area 61d, and sealed by the protection sealing member 62b provided outside the sealing member 62a.

As stated, according to the sealing valve of the fourth embodiment, because the sealing valve element 62 can retreat to the valve element retreat area 61d to block off the sealing member 62a from the space 61a, the sealing member 62a can be isolated from the fluid passage when the sealing valve is fully opened. Therefore, even when gas flowing through the fluid passage includes plasma and/or radicals in the plasma, the sealing member 62a is prevented from being exposed to the plasma and/or radicals, thereby achieving a longer operating life of the sealing member 62a.

In addition, the sealing valve 80 according to the fourth embodiment can provide advantages in that the sealing valve 80 may be produced at lower costs and maintenance costs may be decreased because the sealing valve 80 is not integrally configured with the control valve element.

Moreover, because the sealing valve 80 according to the fourth embodiment does not include a portion having a pressure control capability, maintenance can be easily carried out, compared to a valve integrated with such a portion.

Figure 14:
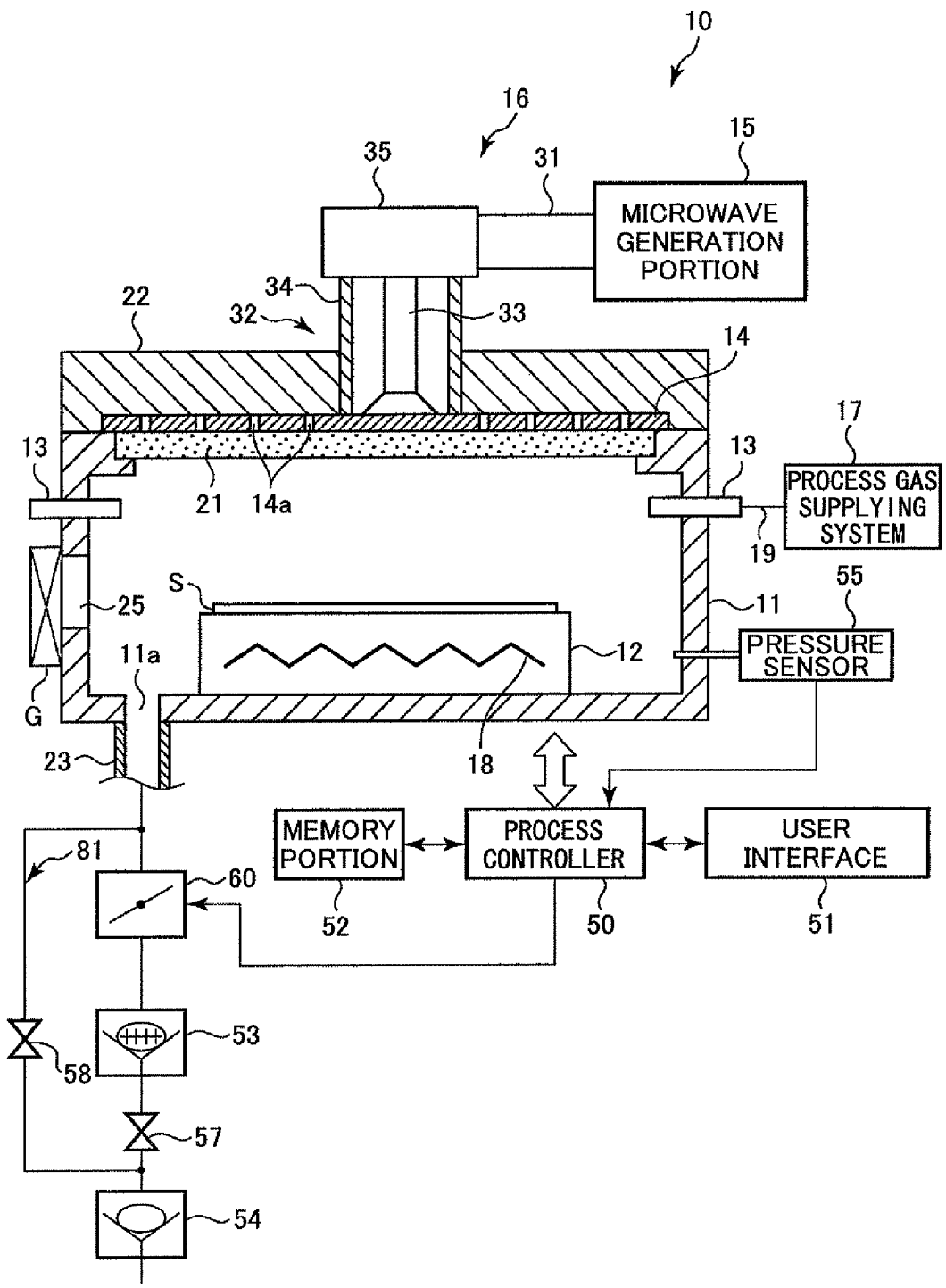
FIG. 14 is a schematic cross-sectional view of a RLSA microwave plasma processing apparatus that employs the valve according to the fourth embodiment.

FIG. 14 is a schematic cross-sectional view of an RLSA microwave plasma processing apparatus 10 employing a sealing valve according to the fourth embodiment of the present invention.

The plasma processing apparatus shown in FIG. 14 is different from the plasma processing apparatus shown in FIG. 1 in that a by-pass line 81 reaches directly to the dry pump 54 from the chamber 11, not by way of the pressure control valve 60 and the drag pump 53. An open/close valve 58 is provided in the middle of the by-pass line 81 and the open/close valve 58 is opened/closed to control opening/closing of the by-pass line 81.

As shown in FIG. 14, the open/close valve 58 is provided between the chamber 11 and the dry pump 54. Namely, one end of the open/close valve 58 is in communication with the chamber 11 and the other end of the open/close valve 58 is in communication with the dry pump 54. The open/close valve 58 that enables or disables gaseous communication between the chamber 11 and the dry pump 54 has to sufficiently seal off the dry pump 54 during a process in the chamber 11. If the sealing is not sufficient, a gas flows toward the chamber 11 whose inner pressure is lower, which may hinder the process in the chamber 11. In addition, because the open/close valve 58 is in communication with the chamber 11, a sealing member provided in the open/close valve 58 may be exposed to plasma and/or radicals in the plasma when the open/close valve 58 is fully opened. Therefore, the sealing member of the open/close valve 58 is likely to be deteriorated.

In this regard, because the sealing member 62a is isolated in the sealing valve 80 according to the fourth embodiment when fully opened, the sealing valve 80 may be preferably used as the open/close valve 58 that may be exposed to plasma and/or radicals in the plasma.

As a valve that may be exposed to plasma and/or radicals in the plasma, there is the open/close valve 58 shown in FIG. 10 referenced in the third embodiment. The sealing valve 80 according to the fourth embodiment may be preferably used as the open/close valve 58 shown in FIG. 10.

Incidentally, while the sealing valve 80 according to the fourth embodiment may be used as the open/close valves 58 shown in FIGS. 10 and 14, the sealing valve 80 is not used exclusively as the open/close valves 58. For example, the sealing valve 80 may be used as the open/close valves 56, 57 shown in FIG. 1 and the open/close valve 57 shown in FIGS. 10 and 14.

Figure 15:
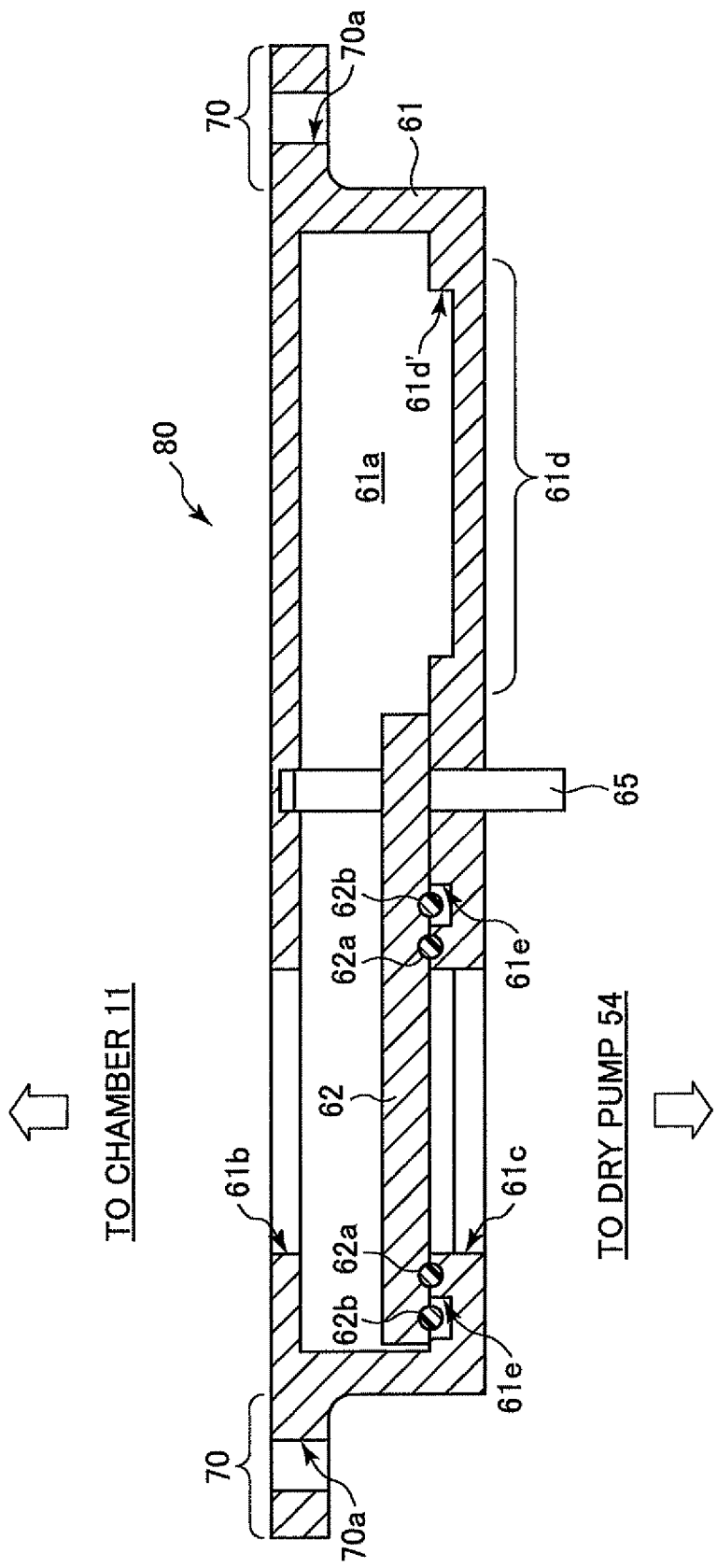
FIG. 15 is a cross-sectional view illustrating another example of the valve according to the fourth embodiment.

The sealing valve 80 according to the fourth embodiment may be modified as explained in the first embodiment. For example, as shown in FIG. 15, the sealing valve 80 may be provided with the flanges 70 with coupling portions 70a such as holes, taking account of being coupled with a pressure control valve, other valves, pipes, and the like.

Moreover, the sealing valve 80 according to the fourth embodiment may be modified in a manner similar to the pressure control valve 60 according to the second and the third embodiments. In the following, such modifications are explained as fifth and sixth embodiments.

Fifth Embodiment

Figure 16:
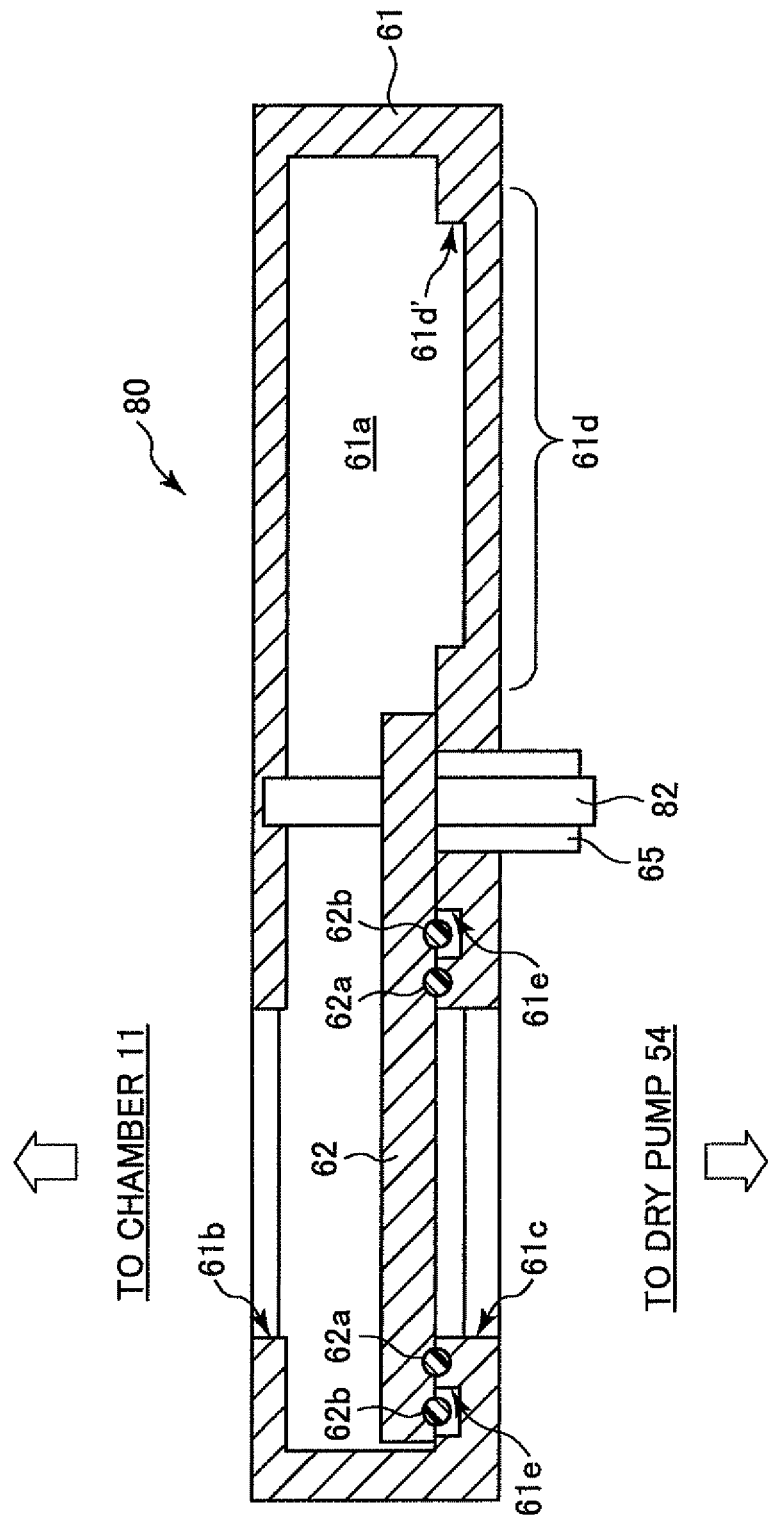
FIG. 16 is a cross-sectional view illustrating a valve according to a fifth embodiment.

FIG. 16 illustrates a configuration of a sealing valve 80 according to the fifth embodiment. FIG. 16 is a cross-sectional view and corresponds to the cross section taken along the B-B line in FIG. 12 that illustrates a situation where the opening is sealed by the sealing valve element.

As shown in FIG. 16, the sealing valve 80 may have the pivot shaft 65 for pivoting the sealing valve element 62 as a hollow shaft. When the pivot shaft 65 is the hollow shaft, a guide shaft 82 is housed inside the pivot shaft 65. Because other configurations are the same as the pressure control valve 60 according to the second embodiment, in FIG. 16, the same reference symbols are given to the same portions as those in FIG. 7, and repetitive explanations are omitted.

The sealing valve 80 according to the fifth embodiment is compatible with the sealing portion of the pressure control valve 60 according to the second embodiment. For example, the sealing valve 80 according to the fifth embodiment has an advantage in that the sealing portion of the pressure control valve 60 can be easily altered by replacing the guide shaft 82 with the pivot shaft 64 explained in the second embodiment.

In addition, because of not being integrated with the pressure control portion for controlling pressures in the same manner as the fourth embodiment, the sealing valve 80 according to the fifth embodiment provides an advantage in that production costs and maintenance costs are decreased.

Sixth Embodiment

Figure 17:
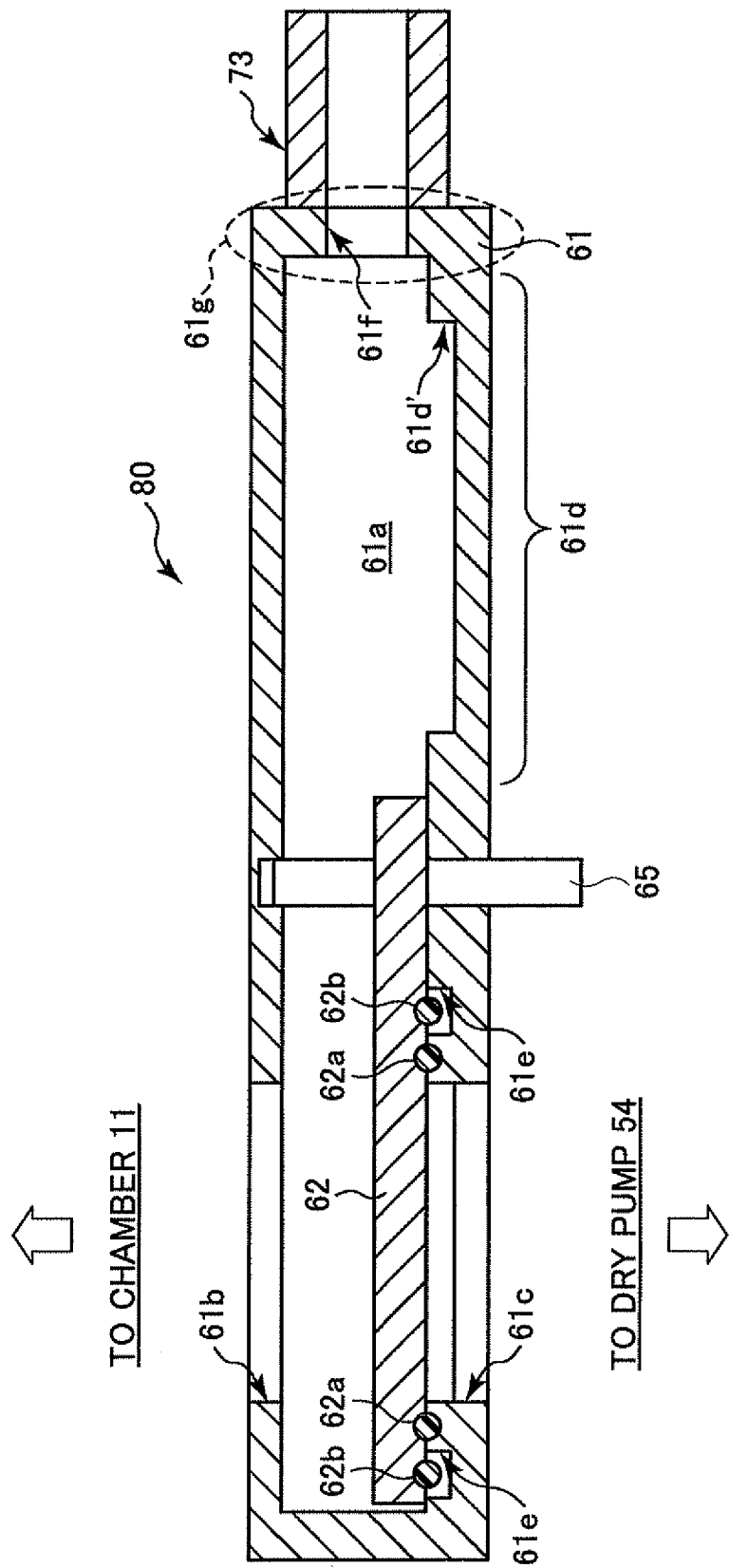
FIG. 17 is a cross-sectional view illustrating a valve according to a sixth embodiment.

FIG. 17 illustrates a configuration of a sealing valve 80 according to the sixth embodiment. FIG. 17 is a cross-sectional view and corresponds to the cross section taken along the B-B line in FIG. 12 that illustrates a situation where the opening is sealed by the sealing valve element.

As shown in FIG. 17, the sealing valve 80 according to the sixth embodiment is provided in the valve body 61 with an opening 61f that is the same as the opening 61f explained in the third embodiment. Because other configurations are the same as those of the pressure control valve 60 according to the third embodiment, in FIG. 17, the same reference symbols are given to the same portions as in FIG. 8, and repetitive explanations are omitted.

In the sealing valve 80 according to the sixth embodiment, the opening 61f can be used as an opening to which a by-pass valve is connected, for example, when the opening 61c of the valve body 61 is sealed by the sealing valve element 62, in a manner similar to the pressure control valve 60 according to the third embodiment. In addition, the opening 61f may provide a cleaning path when the inside of the valve body 61 is cleaned.

In addition, also in the sixth embodiment, because the opening 61f is provided in the space 61a away from the fluid passage connecting the opening 61b and the opening 61c, in the same manner as the third embodiment, an inner portion of the space 61a, which is especially farther away from the fluid passage, is effectively cleaned.

Moreover, in the sixth embodiment, the opening 61f is provided in a position in the space 61a that allows the fluid path to be produced along the sealing valve element 62, in the same manner as the fourth embodiment. The opening 61f is provided in the wall portion 61g that is in parallel with the fluid path and the farthest away from the fluid passage in the direction intersecting the extending direction of the fluid passage.

According to the sealing valve 80 according to the sixth embodiment, the same advantage as that of the sealing portion of the pressure control valve 60 according to the third embodiment can be obtained Because the sealing valve 80 according to the sixth embodiment does not have a portion with the pressure controlling capability, production costs and maintenance costs of the sealing valve 80 can be decreased. In addition, because the sealing valve 80 according to the sixth embodiment is not integrated with the portion with the pressure controlling capability, maintenance may be facilitated compared with a valve with such a portion integrated. Moreover, the sealing valve 80 according to the sixth embodiment may be used as any sealing valve in a processing apparatus, and thus is versatile.

Incidentally, because the sealing member 62a is isolated from the fluid passage at the time of being fully opened in the sealing valve 80 according to the fifth and sixth embodiments in the same manner as the fourth embodiment, the sealing valve 80 is preferably used as a valve that may be exposed to plasma and radicals at the time of being fully opened.

In addition, while the sealing valve 80 according to the fifth and sixth embodiments is preferably used as the open/close valve 58 shown in FIGS. 10 and 14, the sealing valve 80 is not used exclusively as the open/close valve 58. In the same manner as the sealing valve 80 according to the fourth embodiment, the sealing valve 80 according to the fifth and sixth embodiments may be used as the open/close valve 56, 57 shown in FIG. 1 and the open/close valve 57 shown in FIGS. 10 and 14.

Seventh Embodiment

Figure 18:
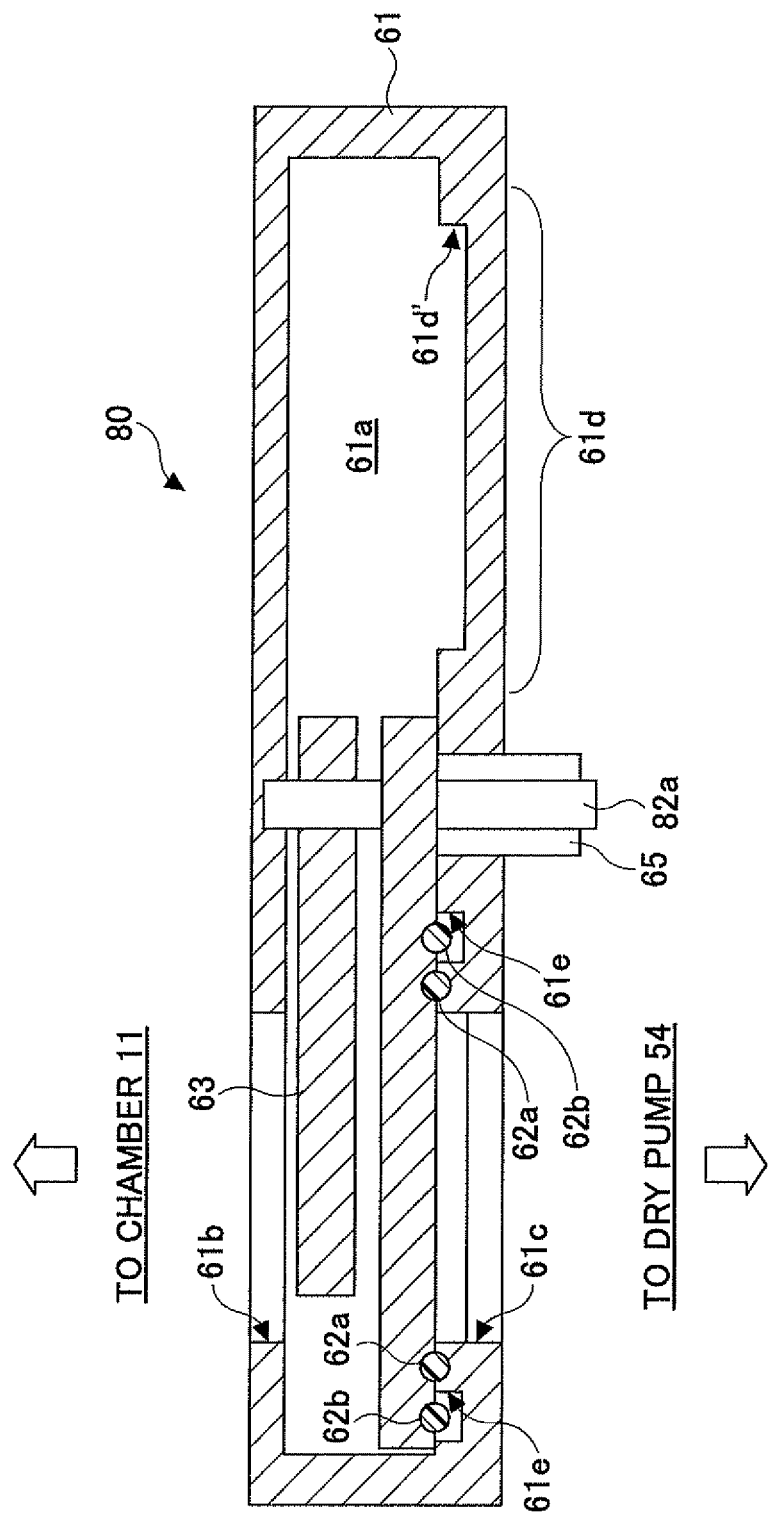
FIG. 18 is a cross-sectional view illustrating a valve according to a seventh embodiment.

Next, a valve according to a seventh embodiment of the present invention is explained with reference to FIG. 18. A valve 80 according to the seventh embodiment may be used, for example, as the pressure control valve 60 of the RLSA microwave plasma processing apparatus 10 shown in FIG. 1. As shown in FIG. 18, the valve 80 includes the valve body 61 including openings 61b, 61c configured to enable gaseous communication between the chamber 11 and the drag pump 53 (FIG. 1); the sealing valve element 62 that is inside the valve body 61 and comes in contact with or moves away from the opening 61c to open or close the opening 61c; the sealing valve element 62 that is inside the valve body 61 and comes in contact with or moves away from the opening 61c to open or close the opening 61c; the sealing member 62a that is provided in the sealing valve element 61 and seals the opening 61c when the opening 61c is closed by the sealing valve member 62; the valve element retreat area 61d that is provided in a wall portion away from the opening 61c of the valve body 61 and blocks off the sealing member 62a from the inner space of the valve body 61 when the sealing valve element 62 moves away from the opening 61c; the pivot shaft 65 that may pivot the sealing valve member 62 to be positioned in one of the opening 61c and the valve element retreat area 61d; the control valve element 63 that is inside the valve body 61 and configured to be openable/closable with respect to the opening 61b of the valve body 61; and a pivot shaft 82a that pivots the control valve element 63 to adjust an opening degree of the opening 61b.

The pivot shaft 65 is movable in both directions along the center axis of the pivot shaft 65. With this, the pivot shaft 65 can pivot the sealing valve element 62 to a position corresponding to the opening 61c and move the sealing valve element 62 closer to or away from the opening 61c in the position, or pivot the sealing valve element 62 to a position corresponding to the valve element retreat area 61d and move the sealing valve element 62 closer to or away from the valve element retreat area 61d in the position.

In addition, the pivot shaft 65 is a hollow shaft with a hollow portion that pivotably houses the pivot shaft 82a. With this, the pivot shaft 65 and the pivot shaft 82a are arranged coaxial with each other and can independently pivot. Therefore, the sealing valve element 62 attached to the pivot shaft 65 and the control valve element 63 attached to the pivot shaft 82a can pivot independently of each other.

The sealing valve element 62 has the protection sealing member 62b surrounding the sealing member 62a in a surface facing the opening 61c. As explained in the preceding embodiments, it is preferable that the protection sealing member 62b have a better radical resistance than that of the sealing member 62a, and the sealing member 62a have a better air-tightness than that of the protection sealing member 62b.

The valve body 61 has in its inside the space 61a, which serves as a space that enables pivotal movement (pendulum movement) of the sealing valve element 62 and the control valve element 63. In addition, the valve body 61 has the concave groove 61e around the opening 61c. The protection sealing member 62b is housed in the concave groove 61e when the opening 61c is sealed by the sealing valve element 62. On the other hand, the sealing member 62a is pressed onto a surround portion of the opening 61c when the opening 61c is sealed by the sealing valve element 62, thereby ensuring the sealing of the opening 61c.

In addition, the circular concave portion 61d' is formed in the center of the valve element retreat area 61d of the valve body 61. When the sealing valve element 62 moves away from the opening 61c to the valve element retreat area 61d, the sealing valve element 62 is housed in the concave portion 61d'. At this time, the protection sealing member 62b is pressed onto an area surrounding the circular concave portion 61d'. With this, the sealing member 62a is air-tightly housed in a space surrounded by the sealing valve element 62 and the concave portion 61d' by the protection sealing member 62b, and thus isolated from the inner space of the valve body 61. Therefore, the sealing member 62a is prevented from being exposed to the gas flowing inside the valve body 61, and thus the sealing member 62a is prevented from being deteriorated even if active gaseous species such as radicals and the like are included in the gas.

In addition, the valve 80 is provided with the opening 61f and the evacuation port 73 connected to the opening 61f, which are explained with reference to FIG. 17. When a pipe is connected to the evacuation port 73, the gas from the chamber 11 (FIG. 1) can be evacuated from the evacuation port 73 through the opening 61b, the inner space (61a), and the opening 61f when the opening 61c is sealed by the sealing valve element 62. Namely, such a fluid route may be used as a by-pass line. Moreover, such a fluid route may be used for cleaning the inside of the valve body 61.

While the present invention has been explained with reference to several embodiments in the foregoing, the present invention is not limited to the preceding embodiments but may be variously modified. For example, while examples are taken where a pressure control valve or open/close valve according to embodiments of the present invention is applied to the RLSA microwave plasma processing apparatus, the pressure control valve or open/close valve may be applied to other plasma processing apparatuses.

The present international application claims the benefit based on Japanese priority Patent Applications Nos. 2007-123266 and 2007-123267, filed on May 8, 2007, with the Japanese Patent Office, the entire contents of which are hereby incorporated by reference.

The invention claimed is:

1. A valve provided between a chamber an inside of which may be maintained at reduced pressure and an evacuation apparatus that evacuates the chamber, the valve comprising:
    a first valve body including a first opening and a second opening that permit gaseous communication between the chamber and the evacuation apparatus, the second opening being formed in one inner wall of the first valve body;
    a sealing valve element that moves near/away from the second opening so as to open/close the second opening, the sealing valve element being located in the first valve body;
    a sealing member provided in the sealing valve element so as to seal the second opening when the sealing valve element closes the second opening;
    a protection sealing member provided in the sealing valve element so as to surround the sealing member;
    a valve element retreat area that is formed in the one inner wall of the first valve body and has a circular concave portion in a center of the valve element retreat area, a bottom surface of the circular concave portion being made of the one inner wall of the first valve body (61-seal) so as to be fixedly closed and having a uniform depth from an inner surface of the one inner wall,
    wherein the sealing member is air-tightly sealed from an inner space of the first valve body by completely enclosing the sealing member in the circular concave portion, the sealing valve element, and the protection sealing member, and by pressing the protection sealing member onto an area of the one inner wall surrounding the circular concave portion when the sealing valve element is moved away from the second opening to the valve element retreat area, wherein a diameter of the circular concave portion, the bottom surface of which has the uniform depth from the inner surface of the one inner wall, is greater than an outer diameter of the sealing member and smaller than an inner diameter of the protection sealing member; and
    a first pivot shaft that pivots the sealing valve element so that the sealing valve element may be located in one of the second opening and the valve element retreat area.

2. The valve recited in claim 1, wherein the first opening is connected to the chamber, and wherein the second opening is connected to the evacuation apparatus.

3. The valve recited in claim 1, wherein the first pivot shaft is configured to pivot the sealing valve element around a center axis of the first pivot shaft as a pivotal center between a first position corresponding to the second opening and a second position corresponding to the valve element retreat area, and wherein the first pivot shaft is configured to move the sealing valve element located in the first position in both directions along the direction of the center axis of the first pivot shaft and to move the sealing valve element located in the second position in both directions along the direction of the center axis of the first pivot shaft.

4. The valve recited in claim 1, wherein the sealing valve element includes the protection sealing member outside of the sealing member, wherein the protection sealing member has a better radical resistance than the sealing member, and wherein the sealing member has a better air-tightness than the protection sealing member.

5. The valve recited in claim 4, wherein the first valve body has a concave groove around the second opening of the first valve body in which concave groove the protection sealing member may be housed, and wherein the protection sealing member is housed in the concave groove when the sealing member closes the second opening of the first valve body.

6. The valve recited in claim 1, wherein the first pivot shaft comprises a hollow shaft that houses a guide shaft therein, wherein the hollow shaft is configured to pivot the sealing valve element around a center axis of the hollow shaft as a pivotal center between a first position corresponding to the second opening and a second position corresponding to the valve element retreat area, and wherein the hollow shaft is configured to move the sealing valve element positioned in the first position in both directions along the center axis of the hollow shaft, and move the sealing valve element positioned in the second position in both directions along the center axis of the hollow shaft.

7. The valve recited in claim 1, further comprising:

a second valve body including a third opening and a fourth opening that enable gaseous communication between the chamber and the evacuation apparatus, the second valve body connecting the first opening with the fourth opening;

a control valve element that is in the second valve body to adjust an opening degree of the third opening of the second valve body and does not have a sealing member; and a second pivot shaft that pivots the control valve element to adjust the opening degree of the third opening of the second valve body.

8. The valve recited in claim 7, wherein the first pivot shaft is configured to pivot the sealing valve element around a center axis of the first pivot shaft as a pivotal center between the first position corresponding to the second opening and the second position corresponding to the valve element retreat area, and wherein the first pivot shaft is configured to move the sealing valve element positioned in the first position in both directions along the center axis of the first pivot shaft, and move the sealing valve element positioned in the second position in both directions along the center axis of the first pivot shaft.

9. The valve recited in claim 8, wherein the second valve body includes a space that may house the control valve element when the control valve element adjusts an opening degree of the third opening of the second valve body, wherein the second pivot shaft pivots the control valve element around a center axis of the second pivot shaft as a pivotal center between the third opening of the second valve body and the space, and wherein the first and the second pivot shafts are coaxial with each other and the first pivot shaft comprises a hollow shaft with a hollow portion in which the second pivot shaft may be housed.

10. The valve recited in claim 8, wherein the sealing valve member includes the protection sealing member outside the sealing member, wherein the protection sealing member has a better radical resistance than the sealing member, and wherein the sealing member has better air-tightness than the protection sealing member.

11. The valve recited in claim 10, wherein the first valve body has a concave groove around the second opening of the first valve body in which concave groove the protection sealing member may be housed, and wherein the protection sealing member is housed in the concave groove when the sealing member closes the second opening of the first valve body.

12. The valve recited in claim 7, wherein at least one of the first valve body and the second valve body includes a fifth opening.

13. The valve recited in claim 12, wherein the fifth opening allows gas flowing in from the third opening of the second valve body to flow out therefrom when the second opening of the first valve body is closed.

14. The valve recited in claim 7, wherein the first valve body and the second valve body are detachably coupled with each other.

15. The valve recited in claim 1, wherein the first valve body includes a fifth opening.

16. The valve recited in claim 15, wherein the fifth opening allows gas flowing in from the first opening to flow out therefrom when the second opening is closed.

17. The valve recited in claim 1, further comprising:

a control valve element configured to be openable/closable with respect to the first opening of the first valve body; and a second pivot shaft that pivots the control valve element to adjust an opening degree of the first opening.

18. A processing apparatus comprising:

a chamber an inside of which may be maintained at vacuum and in which an object to be processed is housed;

a processing mechanism for carrying out a plasma process on the object to be processed in the chamber;

an evacuation apparatus that evacuates the chamber; and the valve recited in claim 1, the valve being provided between the chamber and the evacuation apparatus.

19. The processing apparatus recited in claim 18, wherein the first valve body includes a fifth opening, wherein the second opening of the first valve body is closed by the sealing valve element when an inside of the first valve body is cleaned, and wherein gas flows through the fifth opening from the inside of the first valve body.

* * * * *